United States Patent
Tamazato

(10) Patent No.: US 11,747,483 B2
(45) Date of Patent: Sep. 5, 2023

(54) POSITIONING CALIBRATION METHOD FOR CONSTRUCTION WORKING MACHINES AND ITS POSITIONING CALIBRATION CONTROLLER

(71) Applicant: TOTALMASTERS CO., LTD., Kuwana (JP)

(72) Inventor: Yoshinao Tamazato, Kuwana (JP)

(73) Assignee: Totalmasters Co. Ltd, Kuwana (JP)

( * ) Notice: Subject to any disclaimer, the term of this patent is extended or adjusted under 35 U.S.C. 154(b) by 87 days.

(21) Appl. No.: 17/138,377

(22) Filed: Dec. 30, 2020

(65) Prior Publication Data
US 2021/0293972 A1 Sep. 23, 2021

(30) Foreign Application Priority Data
Mar. 18, 2020 (JP) .................... 2020-048380

(51) Int. Cl.
*G01S 19/23* (2010.01)
*G01C 25/00* (2006.01)
*G01C 15/00* (2006.01)

(52) U.S. Cl.
CPC .............. *G01S 19/23* (2013.01); *G01C 15/00* (2013.01); *G01C 25/00* (2013.01)

(58) Field of Classification Search
CPC .......... G01C 25/00; G01C 15/00; G01S 19/23
See application file for complete search history.

(56) References Cited

U.S. PATENT DOCUMENTS

| | | | | |
|---|---|---|---|---|
| 5,018,617 | A | * | 5/1991 | Miyata ................. B23Q 7/1431 198/465.1 |
| 6,966,108 | B2 | | 11/2005 | Sato et al. |
| 9,551,133 | B2 | * | 1/2017 | Ikegami ................. E02F 3/435 |

(Continued)

FOREIGN PATENT DOCUMENTS

| | | |
|---|---|---|
| CN | 109444936 A | 3/2019 |
| JP | 2001-159518 A | 6/2001 |

(Continued)

OTHER PUBLICATIONS

Sep. 7, 2021 Office Action issued in Japanese Patent Application No. 2020-048380.

(Continued)

*Primary Examiner* — Kyle R Quigley
*Assistant Examiner* — Aeysha N Sultana
(74) *Attorney, Agent, or Firm* — Oliff PLC

(57) ABSTRACT

A positioning calibration controller for measuring and calibrating the configuration dimensions of a construction working machine having an machine body including a first surveying device for surveying the position coordinates and a movable working tool including one or more angle detecting devices, wherein the positioning calibration method and the positioning calibration controller of the construction working machine having the feature of specifying the configuration dimensions and the configuration positions of the movable business tool by the position measurement data and the angle data detected by the angle detecting device by measuring the position coordinates of the plurality of posture positions of the movable business tool by a second surveying device.

14 Claims, 17 Drawing Sheets

(56) References Cited

U.S. PATENT DOCUMENTS

| | | | |
|---|---|---|---|
| 2006/0074517 A1* | 4/2006 | Schneider | B66C 13/063 |
| | | | 700/213 |
| 2014/0271074 A1* | 9/2014 | Ogawa | E02F 9/264 |
| | | | 414/687 |
| 2015/0330060 A1* | 11/2015 | Seki | G01S 19/14 |
| | | | 701/33.1 |
| 2016/0298316 A1* | 10/2016 | Iwamura | E02F 3/435 |
| 2017/0121930 A1* | 5/2017 | Kitajima | E02F 9/2296 |

FOREIGN PATENT DOCUMENTS

| | | |
|---|---|---|
| JP | 2002-181538 A | 6/2002 |
| JP | 2002-181539 A | 6/2002 |
| JP | 2012-202063 A | 10/2012 |
| JP | 2018-145693 A | 9/2018 |
| JP | 2018-146407 A | 9/2018 |
| JP | 2018-146408 A | 9/2018 |
| JP | 2020-002708 A | 1/2020 |
| JP | 2020-034453 A | 3/2020 |
| WO | 2015/173920 A1 | 11/2015 |

OTHER PUBLICATIONS

Argument to Sep. 7, 2021 Office Action issued in Japanese Patent Application No. 2020-048380.
Argument to Dec. 2, 2020 Office Action issued in Japanese Patent Application No. 2020-048380.
Dec. 2, 2020 Notice of Reasons for Rejection issued in Japanese Patent Application No. 2020-048380.
Aug. 4, 2020 Office Action issued in Japanese Patent Application No. 2020-048380.
Argument to Aug. 4, 2020 Office Action isssued in Japanese Patent Application No. 2020-048380.
Dec. 2, 2020 Office Action issued in Japanese Patent Application No. 2020-048380.
Oct. 13, 2021 Decision to Grant issued in Japanese Patent Application No. 2020-048380.

* cited by examiner

[FIG. 1]
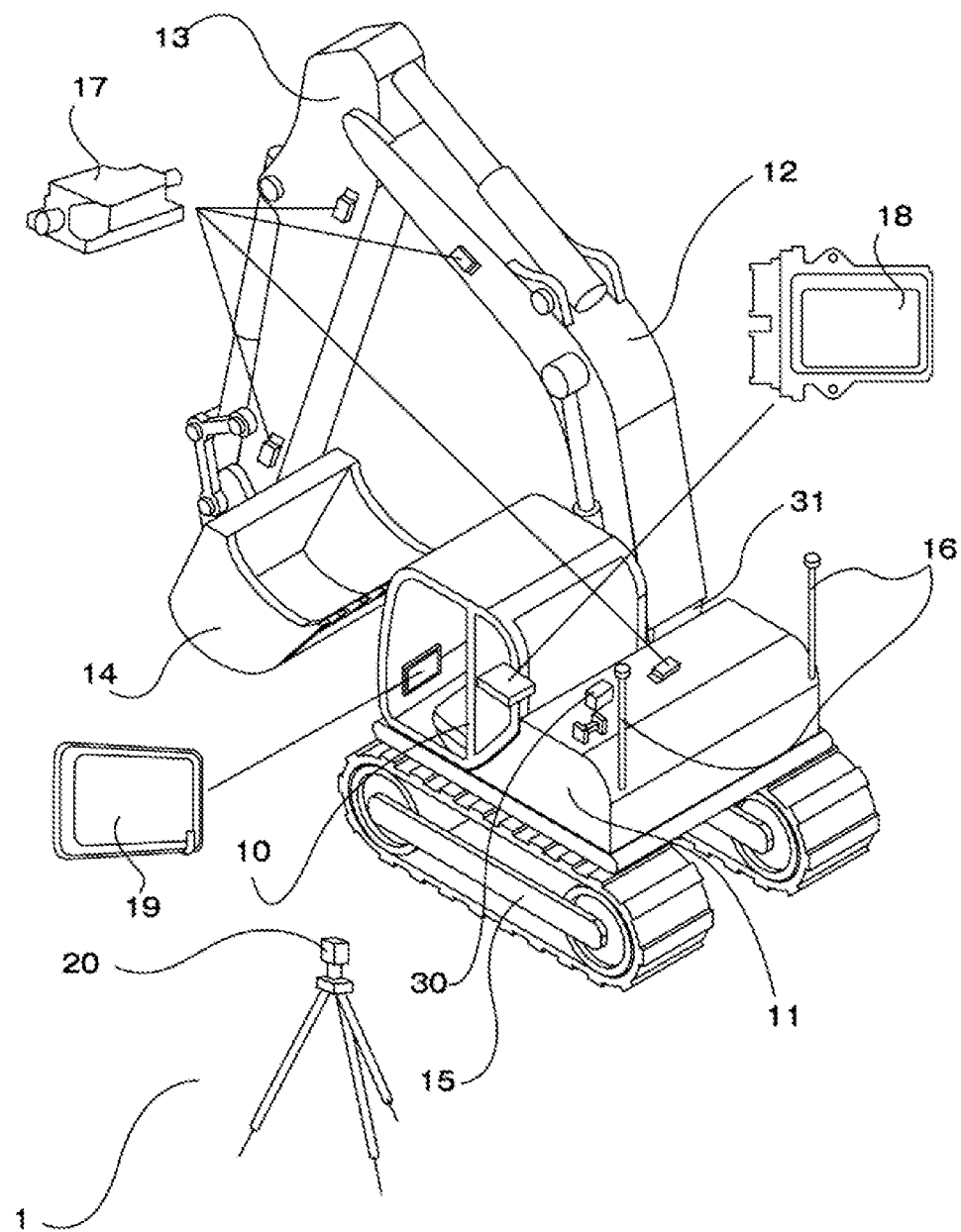
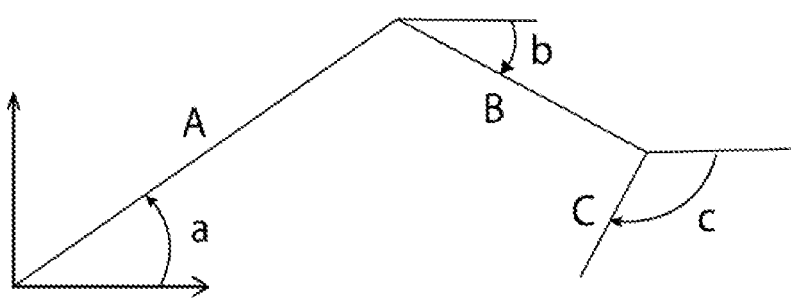

[FIG. 2]
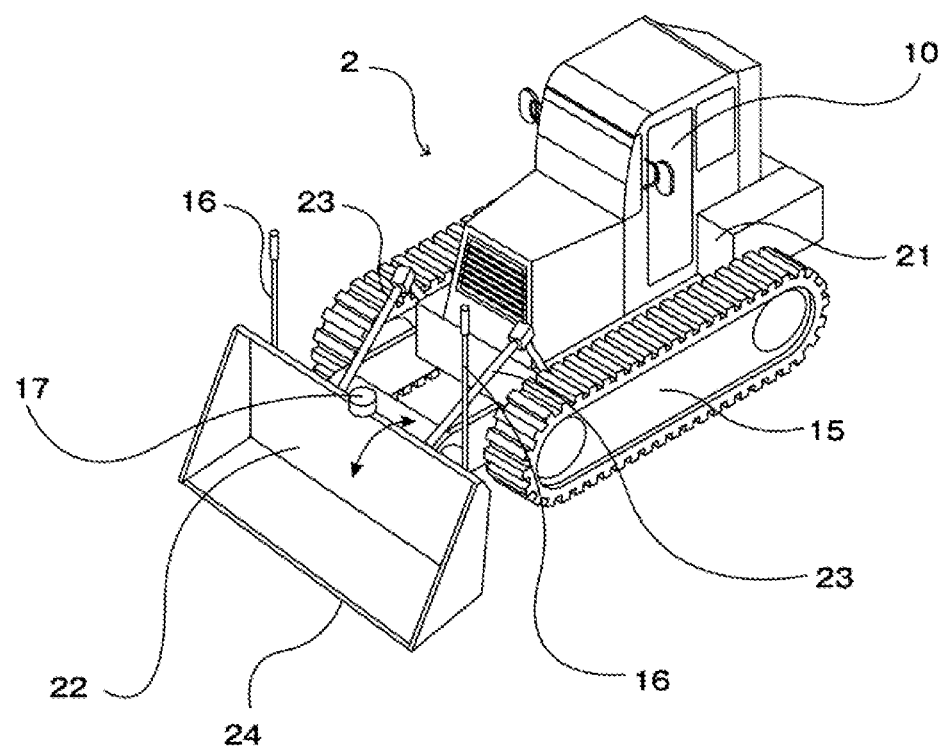

[FIG. 3]
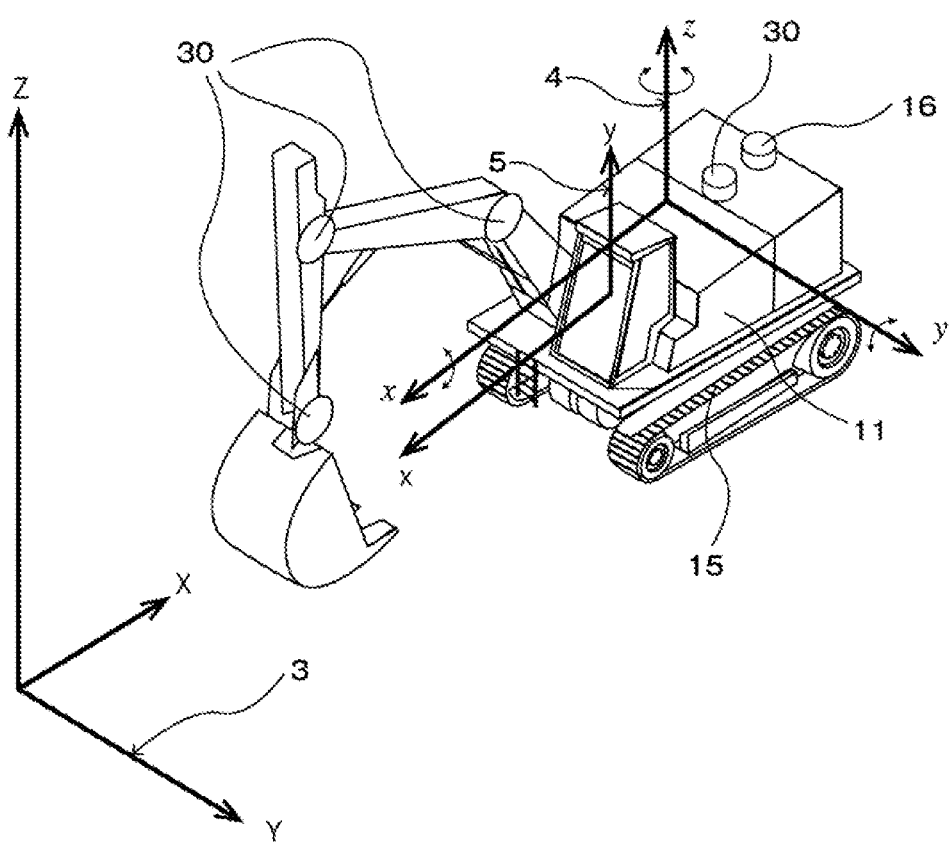

[FIG. 4]
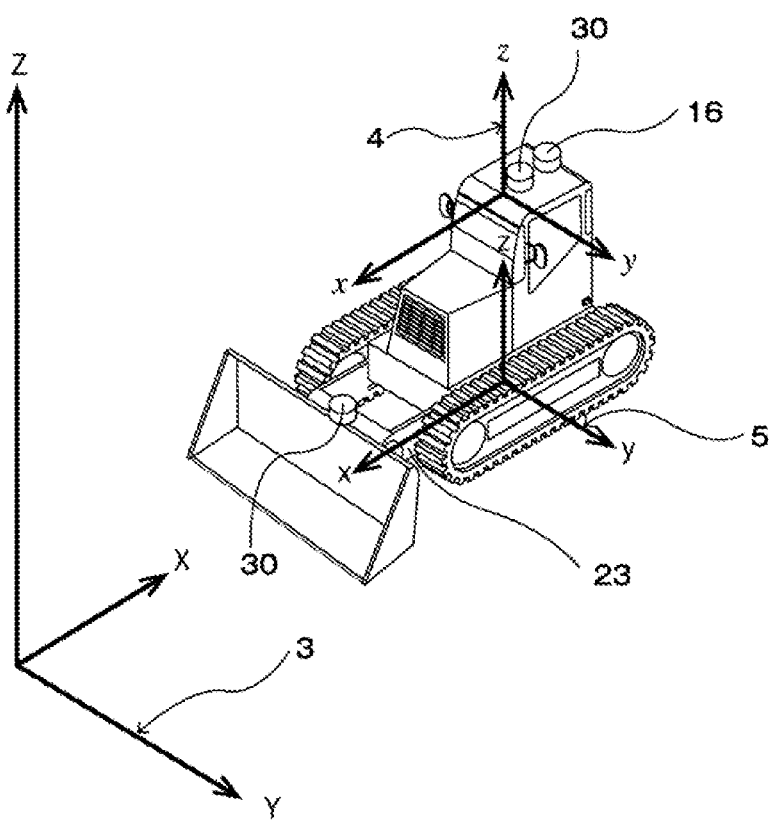

[FIG. 5]
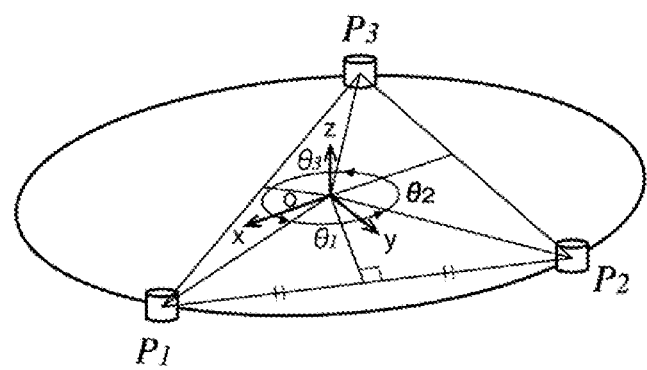

[FIG. 6]
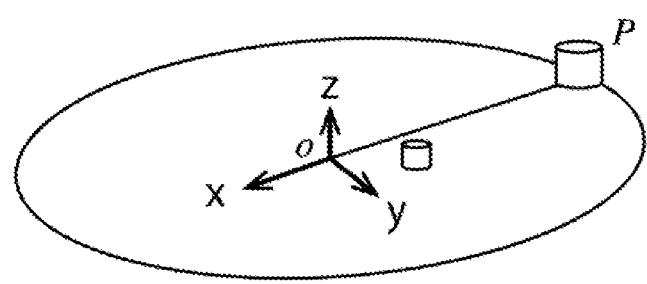

[FIG. 7]
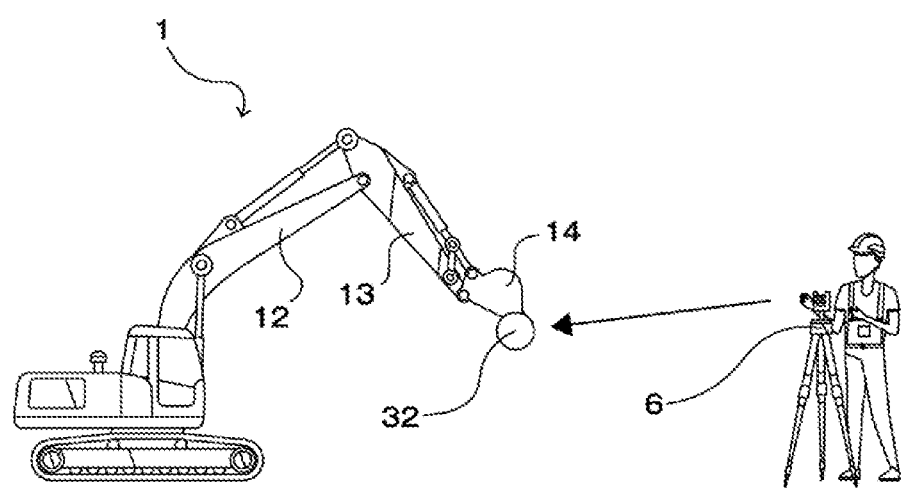

[FIG. 8]
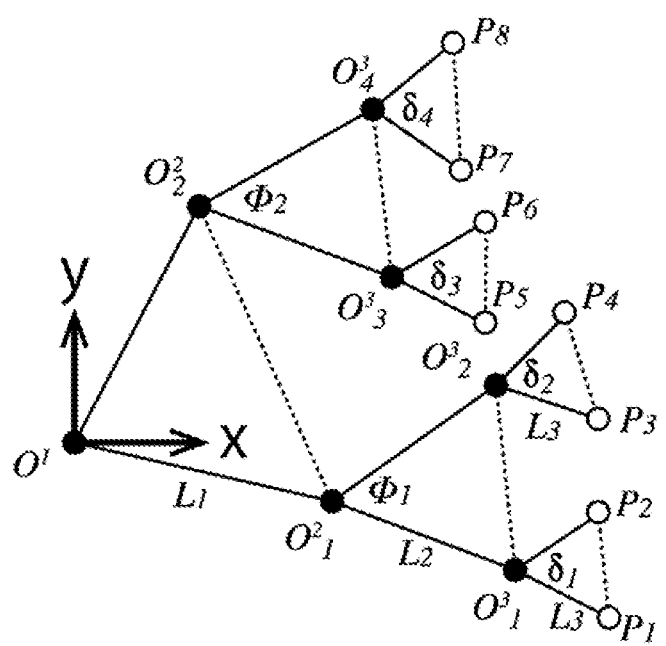

[FIG. 9]
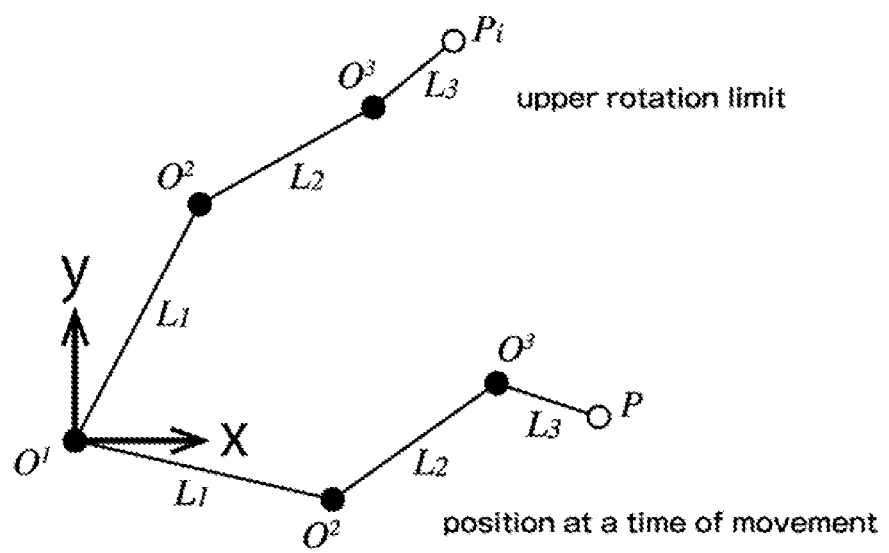

[FIG. 10]
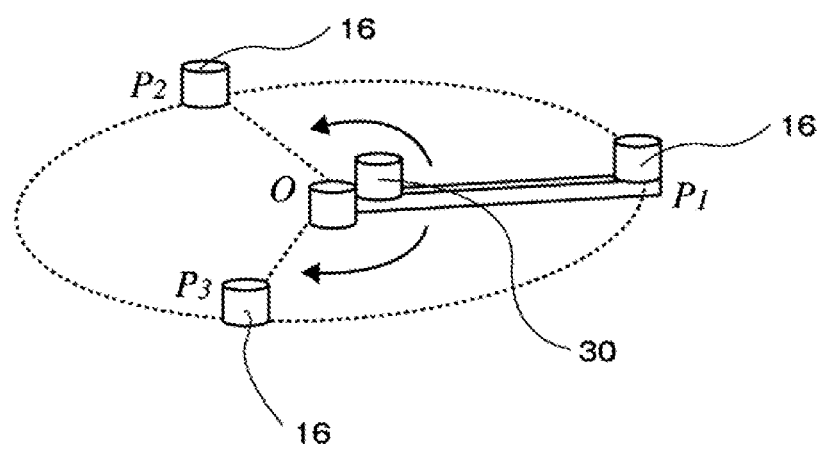

[FIG. 11]
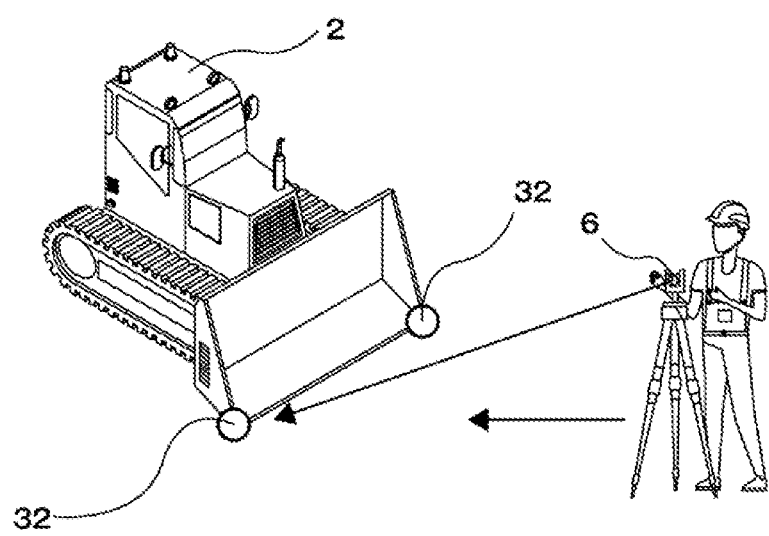

[FIG. 12]
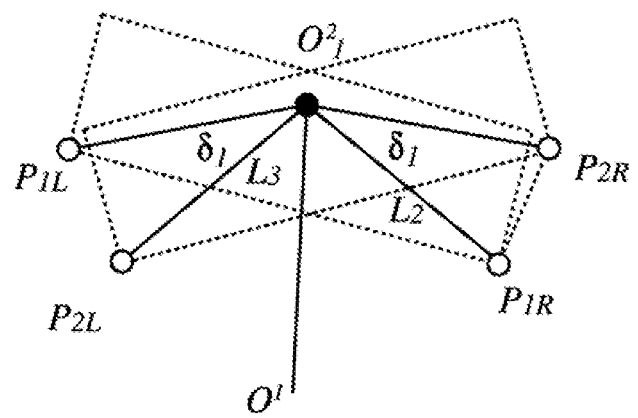

[FIG. 13]
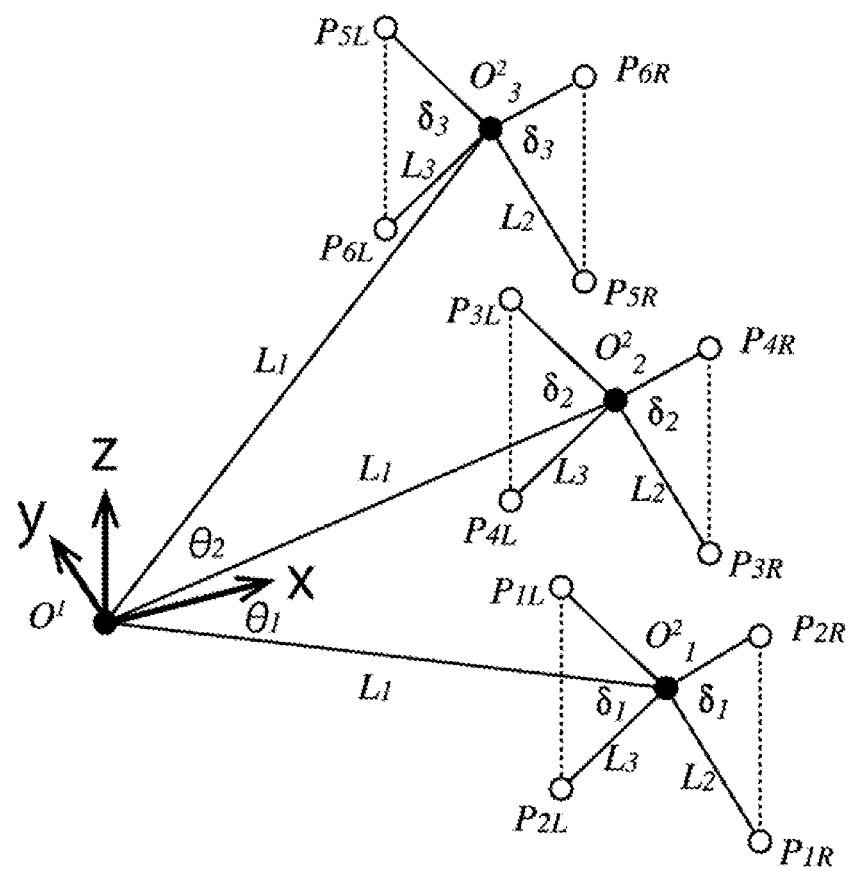

[FIG. 14]
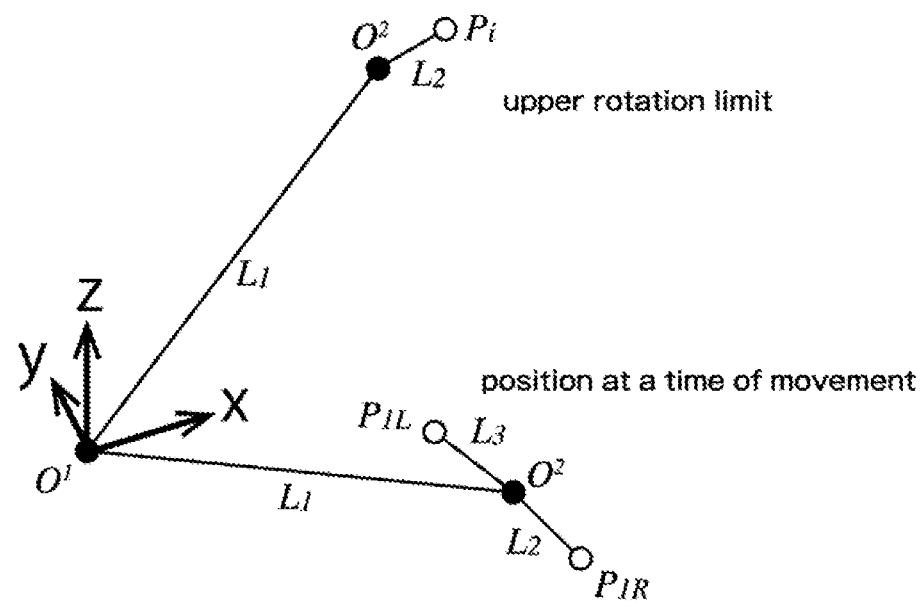

[FIG. 15]
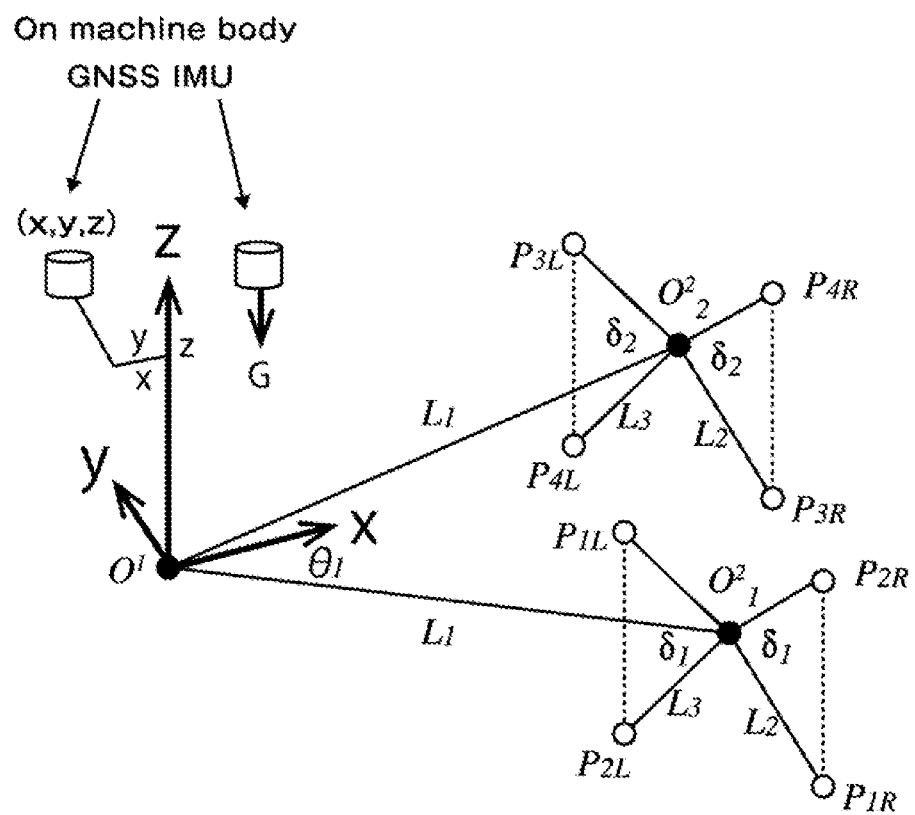

[FIG. 16]
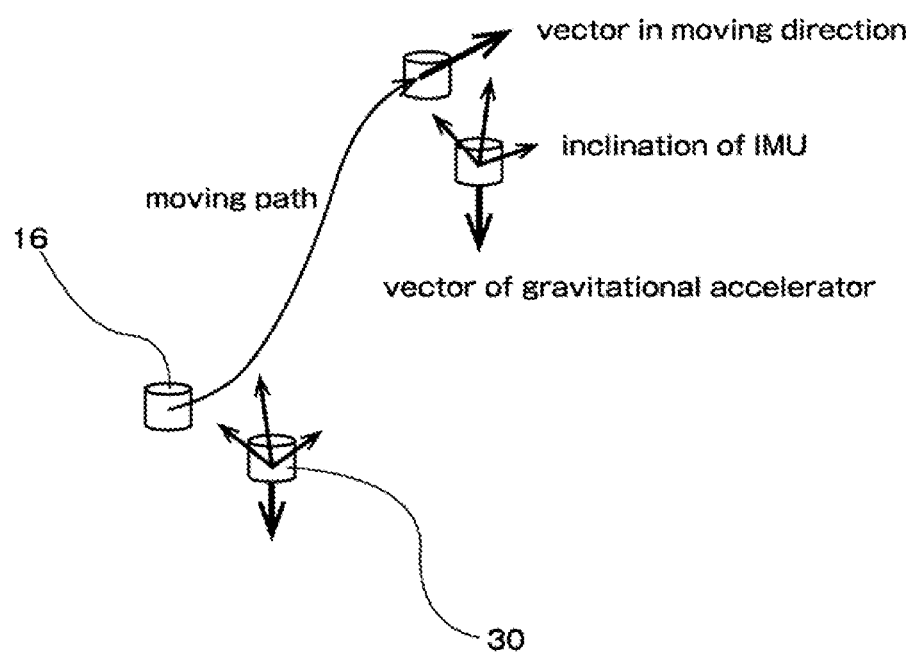

[FIG. 17]
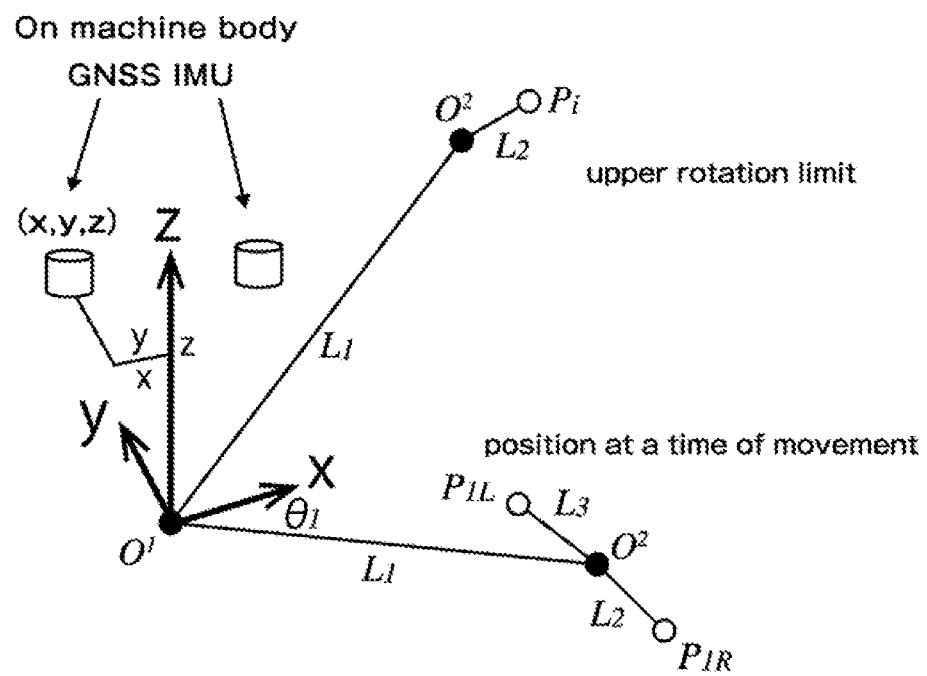

POSITIONING CALIBRATION METHOD FOR CONSTRUCTION WORKING MACHINES AND ITS POSITIONING CALIBRATION CONTROLLER

TECHNICAL FIELD

The present invention relates to a positioning and calibration method for construction working machines, and more particularly to simplification and accurate calibration of the positional detection of the movable working portion with GNSS.

BACKGROUND

Generally, in the civil engineering and the construction fields, backhoes are conventionally used as construction working machines in leveling ground, paving, etc. Backhoes are also called hydraulic excavators. Recently, in the operation of the backhoe, movement of a machine body or driving or rotation of a boom, an arm, a bucket, etc. as an upper drive body (movable working portion or movable working member, also referred to as a drive working tool) is specified, and automatically controlled in accordance with the shape of the field leveling, or machine guidance control is performed to assist an operator in the operation. To perform such a control, it is necessary to accurately grasp the position (coordinate) of the blade edge of the bucket, and to accurately grasp the dimensions of the upper rotating body (also referred to as the upper rotation body), the boom, the arm, the bucket, etc. and the tilt angle of each member.

Further, in the civil engineering and the construction fields, bulldozers are used as construction working machines in leveling ground and pavement. The operation and movement of this bulldozer, and the operation of the blade (soil removal plate) are often carried out automatically, while specifying them in advance. Therefore, machine guidance control is carried out in assisting the operation of the bulldozer with an operator. In order to perform such controls, it is necessary to accurately grasp the position of the blade edge of the blade.

The main construction working machines and their names in the present invention will be outlined below.

A backhoe (hydraulic excavator) is a working machine for processing earth surfaces, among construction machines collectively called hydraulic excavators, and it has a feature that a bucket is attached in an operator side direction. The operator operates the bucket facing the operator in a direction that draws (holds) toward the operator. A boom, an arm, and a bucket are coupled suitably for excavation at a place under the ground surface, and the backhoe includes working tools that each operate as a rotation driving body.

The bulldozer is a construction machine used for scraping earth and sand, embankment, and leveling, and a movable blade (soil removal plate) is mounted on a front face of a tractor. The blade is moved up and down by means of push arms which extend from both sides of the machine and push out the earth and sand in a forwarding direction. The bulldozer is equipped with a working tool comprising the blade (soil removal plate which turns right and left.

A machine guidance is a system that displays the current position of the working tools of construction machine and a design surface on a monitor of a driver's seat to assist the operator to control the machine smoothly and accurately.

In order to operate these construction working machines with high accuracy, the positioning and calibration work are required to grasp the position of each rotation or drive working tool with high accuracy and input error-free data into the machine guidance.

In the backhoe, conventionally, in order to obtain the correction amount of a tilt sensor, the boom is set to a known tilt angle, for example, horizontally, outputs of the tilt sensor are obtained in this state, and they are compared. However, in conventional methods, another tilt angle measuring device is required to make the angle of the boom to a known tilt angle, e.g., horizontal. In addition, care should be taken not to affect the angular error due to unstable posture.

The same applies to bulldozers, and when setting the position correction amount by placing a position measuring device, information about the dimensions of each member based on a design drawing or the like can be used. However, there may be no such information among such existing backhoes and bulldozers, in which case it is necessary to accurately measure the dimensions of machine bodies, booms, arms, buckets, blades, links (frame, push arms, etc.) that support the blades from the vehicle bodies. However, in the field work, there is a big problem that they can not be measured accurately.

For example, Patent Document 1 is a method of obtaining a correction amount of a tilt sensor disposed on a rotatable member arranged in the construction working machine.

This method discloses a technical idea of obtaining a correction amount of the tilt in the construction working machine, which is characterized in that a plurality of measurement points are set to a measurement target member which is a member having the tilt sensor disposed thereon, the coordinates of these measurement points are surveyed by a surveying device, the tilt angle of the measurement target member is calculated from the coordinates of the plurality of measured measurement points, and the correction value of the tilt sensor is obtained based on the obtained tilt angle and output values of the tilt sensor.

However, in this example, large error occurs, depending on the working machines, in the measurement value due to ambiguity of the measurement position of the members or the dimension of the members, so the accumulated errors due to the accumulation of those errors becomes a large problem. It is also difficult to perform accurate measurements and calibrations at construction sites, etc., and it does not provide a fundamental solution for accurate positioning and calibration.

Patent Document 2 also relates to a method for obtaining a position correction amount between the position of the edge of a soil removal plate disposed via a connecting portion to the vehicle body of the construction working machine and a position acquisition device disposed in the vehicle body. This method discloses a technical idea of obtaining a correction amount of the position of the soil removal plate, which technical idea is characterized in that the position of the position acquisition device and the position of each portion of the construction working machine are measured with a surveying device disposed on a side of the construction working machine, and a position correction amount from the position acquisition device to the blade edge position of the soil removal plate is calculated from these measured values.

Also in this example, large errors occur in the measured values by the ambiguity in the measuring positions of the member and the dimensions of the members in the same manner as mentioned above, and the accumulative error due to the accumulation of such errors becomes a large problem. It is also difficult to perform accurate measurements and calibrations at the construction site, etc., and it does not provide a fundamental solution for accurate positioning and calibration.

While the foregoing has been specifically described for backhoes and bulldozers of the construction working machines, it is added that the construction working machines in the present invention means the general construction working machines including not only backhoes and bulldozers but also cranes, loaders, scrapers, wheel loaders, ladder trucks, and the like.

PRIOR ART DOCUMENTS

Patent Document

[Patent Document 1] JP-A-2018-146408
[Patent Document 2] JP-A-2018-145693
[Patent Document 3] JP-A-2018-146407
[Patent Document 4] JP-A-2002-181539

SUMMARY OF THE INVENTION

Problems to be Solved by the Invention

An object of the present invention is to grasp a driving position of a drive working tool of a construction working machine involving a drive working tool. Generally, the position of the drive working tool is surveyed by various surveying means. In order to accurately perform the positioning, it is necessary to perform calibration to grasp the arrangement and relative position of the measuring instrument related to the positioning. As described below, the conventional calibration method has been processed in a separate mechanism from the measurement by the measuring instrument, so there was a limit for accuracy.

According to the present invention, the measuring instrument related to the calibration is made the same as the measuring instrument related to the positioning, so that it is possible to simplify the calibration and improve the accuracy of thereof. Also, the cost of the whole measuring instrument can be reduced, and the positioning system of including the calibration has a great merit that it can be set later on existing construction working machines.

Though a method is well known in the conventional technique or technical idea, for example, the position and posture of a machine body (main body of a construction working machine) are measured first. Specifically, two receivers (antennas) of GNSS (Global Navigation Satellite System/global positioning satellite systems) are placed on the left and right of the machine body, so that the position of the machine body and the tilt in a lateral direction are measured, and a to-and-fro tilt of the machine body are measured by using an angle sensor. In case of a backhoe, the position of a tip of blade (tip) of a bucket is measured.

The rotation angles of the boom, the arm, and the bucket are then measured with angle sensors attached thereto, respectively. (hereafter, the global positioning satellite system is referred to as "GNSS".)

Thereby, the position of the (tip) of the boom for the root thereof is calculated (Refer to FIG. 1). If the lengths of the boom, the arm and the bucket, each to be rotationally driven, are taken as A, B, C, respectively, the coordinate of the tip of the bucket is defined by (A cos a+B cos b+C cos c, A sin a+B sin b+C sin c). Next, a coordinate composition is performed by combining the position of the machine body with that of the tip of the blade inclined by the tilt of the machine body only. This completes the positioning of the backhoe.

Next, a conventionally specific positioning calibration method in the case of the backhoe will be described. For the positions of GNSS antennas, first, in order to set relative positions between the center position of the rotation axis of the boom and the positions of the GNSS antennas, prisms are attached to the boom rotation axis and the respective antennas, their positions are measured by a total station, and the relative values are set from the measured positions. The total station (TS) is the generic name of an optically surveying device which is installed at a reference coordinate point, and is adapted to determine the coordinate of a positioning object by reciprocating a laser beam between the prism attached to the object, and measuring its angle and distance. The total station is abbreviated as "TS" below.

As to the angle of the machine body in operation, it is defined by an angle sensor in that first the machine body is placed in a horizontal position to set a horizontal position (reference point) of the angle sensor, and a differential angle from the horizontal position is measured during operation.

Then, the positioning of the boom, the arm and the bucket as drive working units under rotation driving is performed by attaching angle sensors thereto, respectively. First, the lengths A, B and C of the boom, the arm, and the bucket are specified, respectively. Next, reference points for determining the rotation angles "a", "b" and "c" of the boom, the arm, and the bucket are set, respectively. Then, the machine body is placed on the horizontal plane, the boom, the arm, and the bucket are placed on the horizontal plane in predetermined configurations, prisms are stuck on the rotation axes related to the boom, the arm, and the bucket, respectively, and the positions are measured by the total station.

Based on the respective positions measured in this way, by setting the horizontal distance and the vertical distance between the rotation axes, A and B are determined, so C can be determined by measuring the length of the bucket. The horizontal position is set and taken as the reference point, it is possible to calibrate the positioning of the backhoe at a time of operation by measuring "a", "b", and "c" during operation.

According to a conventional method for calibrating an angle sensor of a boom, an arm and a bucket, first drive working tools, e.g., the boom, the arm and the bucket, of the backhoe are set to predetermined postures such that each of the boom, the arm and the buckets is maximally rotated downwardly (also referred to as bedding the working tools in a horizontal position). Then, a prism of a seat type is stuck to the axis of each of the boom, the arm and the bucket, and the position is measured by TS. Then, A, B, C are determined by putting the respective dimensions obtained, and reference points of "a", "b", "c" are determined by measuring "a", "b", "c", which enables the calibration.

Next, the positioning of the bulldozer is described. There are the following two positioning methods to measure the position and the posture of a blade (soil removal plate) of a bulldozer which is generally well known. (Although a figure is omitted, it can be referred to in FIG. 4.)

Method 1: Two GNSS receivers (antennas) are placed at both ends of a blade (soil removal plate), so that the positions of the receiver antennas on the blade are measured.

Next, an angle change toward a traveling direction of the blade is measured by the angle sensor (The direction changes with an up or down movement of the blade). Although the blade itself does not perform such movement, the orientation of its plane, and thus the angle of an antenna support rods change with the up and down movement of the blade, thus changing the positions of the antenna positions. Therefore, it is necessary to recognize the angle. Then, the position of the blade edge at each end of the lower portion of the blade is recognized by combining the above. Here, a difference in height between left and right sides of the blade is grasped by the position of GNSS.

Method 2: One GNSS receiver (antenna) is placed in the center of the blade (soil removal plate), so that the position of the receiver antenna on the blade is measured by it.

An angle change toward the traveling direction of the blade and an angle change in a lateral direction of the blade are measured by the angle sensor. By combining the above, the position of the blade edge at each end of the lower part of the blade is recognized.

Next, calibration of positioning in the bulldozer will be described. The position of the GNSS antenna first sets the relative position between the antenna and the lower portion of the blade or between the antenna and the angle sensor, and the above relative position is set from the dimensions of the GNSS receiver, the antenna, its support rod and the blade.

Alternatively, a prism is attached on a target location. which is measured with TS. Regarding the angle of the machine body, a horizontal position (reference point) of the angle sensor is set by placing the machine body in a horizontal position. Alternatively, the machine body is moved forward by a predetermined distance (a little), and the reference position of the readable sensor is set based on the deviation of the angle of the angle sensor and the movement of the antenna position at that time. It can be calibrated by measuring the angle of difference from its horizontal position at the time of operation.

Another method for backhoes has been conventionally used. Instead of the GNSS receiver, a prism is installed in an object to be measured, and the position is measured by TS.

This is a method to perform via measuring a recognition of the rotation of a boom, an arm and a bucket by the stroke of hydraulic pressure, and it can be measured if the machine structure is accurately known, but it has a disadvantage in that positions to measure the structure increase. However, this approach does not depend on whether the position of the machine body is measured by GNSS or by TS.

The conventional methods are as described above, but there are many problems.

First of all, measurement of the dimensions of the machine body is difficult and complicated.

For example, the prisms are attached over a plurality of locations, and a sticking error in each location comes out, so those errors are accumulated. It is also a realistic structural problem of the machine body in that the surface is rough (unevenness), so that it is difficult to measure the lengths accurately in the horizontal and vertical directions. Above all, the calibration is time-consuming and complicated, and it is necessary to understand the calibration method, so that it is not easily performed by widely general users (operators). In addition, horizontal installation of the machine body at the time of calibration is often performed on site, so that accuracy cannot be requested in principle. Though it is possible to measure on a precise balance table at the time of factory shipment, it is difficult to obtain the accuracy in the daily use in the field. Thus, there are many constraints and problems in positioning and calibration of the construction machine, but the fundamental solution of the above problems has not been obtained.

The present invention has been made in view of the problems described above, and thus it is an object of the invention that calibration can be facilitated and the accuracy of calibration can be enhanced, by making the measuring instrument relating to the calibration the same as the measuring instrument relating to the positioning, and the cost of the entire measuring instruments can be reduced. Also, the system of positioning including calibration can be set later on an existing machine. It is another object of the present invention to provide a simple positioning and calibration method for a construction working machine, which method can easily and reliably obtain a corrected amount by a tilt sensor on a rotatable drive working tools (also briefly referred to drive working tools, herein) of the construction working machine and a GNSS antenna disposed on a machine body.

Specifically, since it is possible to sample some of the postures and thereby estimate the structure of a working tool without measuring the structure of the working tool itself, the method can be applied in common to the calibration of a machine with a rotary working tool, such as a backhoe or a bulldozer. Then, it is still another object of the present invention to provide a positioning and calibration method to which a method for positioning the position of the working tool of the machine can be diverted.

Measures for Solving the Problem (1) To solve the above problems, a positioning calibration method for a construction working machine according to the present invention is said method being adapted to measure and calibrate a constituent dimension and a constituent position of a movable working tool of the construction working machine, said positioning calibration method for a construction working machine, said method being adapted to measure and calibrate a constituent dimension and a constituent position of a movable working tool of the construction working machine, said construction working machine comprising a first surveying device provided on a machine body for surveying a position coordinates of the machine body, a first angle detecting device provided on the machine body for detecting an angle of the machine body, and at least one second angle detecting device provided on a movable working tool and for said movable working tool, characterized in that a second surveying device is provided outside the construction working machine for surveying the position coordinates of a plurality of posture positions of the movable working tool, the position coordinates of a plurality of posture positions of the movable working tool are measured by said second surveying device, the constituent dimension and the constituent position of the movable working tool are determined by calculation using data of the measured position coordinates of the movable working tool and data of the angles of the movable working tool detected by said second angle detecting device.

(2) Further, the positioning calibration method for the construction working machine according to the present invention, characterized in that on the basis of the constituent dimension and the constituent position and during operation of the construction working machine, said constituent position and said position coordinate of the movable working tool and a tip of the movable working tool during operation time are positioned and determined from operation time position measurement data and operation time posture data of the machine body measured by the first angle detecting device and the first surveying device of the machine body, respectively and operation time angle data of the movable working tool measured by the second angle detecting device.

(3) Further, the positioning calibration method for the construction working machine according to the present invention, specifically is characterized in that in case that said construction working machine is a backhoe or a construction working machine in which the configuration of a movable working tool is similar to that of the backhoe, the movable working tool comprises a bucket, an arm and a boom or an attachment of the arm or the boom, or in case that the construction working machine is a bulldozer, the movable working tool is a blade or in case that the construction working machine is a crane, the movable working tool is a tip hook, the second surveying device is an optical surveying device comprising a total station (TS), a measurement target position of said movable working tool is taken as a measurement position of said optical surveying device, the position measurement is performed in a world geodetic system coordinate, said first surveying device is a GNSS (Global Positioning Satellite System), the position measurement is performed in the world geodetic system, the position measured with the GNSS can be corrected by a reference base station outside the construction working machine or correction information contained in satellite signals, and the second angle detecting device is an angle sensor including an IMU (Inertial Measurement Unit).

That is, in the positioning calibration method for the construction working machine according to the present invention, a coordinate system for the working tool, a coordinate system for the machine body, and the world geodetic system are consistently positioned, and the above consistent value is calibrated and applied at one-point positioning even during operation. Also, a controller and a construction machine incorporating the method are within the scope of the right.

In the construction working machine in the positioning calibration method and its positioning calibration controller according to the present invention, the construction working machines mean general construction working machines with drive working tools, such as not only the backhoe and bulldozer but also crane, loader, scrapper, wheel loader, working ladder, etc. In the following, the present invention will be specifically described with respect to the backhoe and the bulldozer. Details of embodiments will be described later.

(4) In case that said construction working machine is a backhoe or a construction working machine in which the configuration of a movable working tool is similar to that of the backhoe, and said constituent dimension of the movable working tool is positioned and measured by said optical measuring device as the second measuring device, the positioning calibration method for the construction working machine according to the present invention,
wherein in case that said construction working machine is a backhoe or a construction working machine in which the configuration of a movable working tool is similar to that of the backhoe, and said constituent dimension of the movable working tool is positioned and measured by said optical measuring device as the second measuring device, wherein said measurement target position of the said movable working tool is a predetermined place of said bucket, and the position of said predetermined place of the bucket is measured as said measurement position of said optical surveying device, measurement of a plurality of said posture positions of the movable working tool are measurements of positions at a plurality of locations comprising two locations when said bucket is rotated, and two locations when said arm is rotated, and two locations when said boom is rotated, and respective length dimensions of said bucket, said arm and said boom are determined by using measured values obtained by measurement of said positions at a plurality of said positions and angle values measured at a plurality of said locations by the angle detecting devices respectively provided on said bucket, said arm and said boom.

(5) In case that the construction working machine is a backhoe or a construction working machine in which the configuration of the movable working is similar to that of the backhoe, and the position coordinate of the machine body is measured as a position coordinate in the world geodetic system by the first surveying device, the positioning calibration method for the construction working machine according to the present invention is characterized in that said GNSS receiver is provided on a main portion of the machine body as an upper rotating body of the machine body, and a rotation center position of the upper rotating body is determined as a position in the world geodetic system of the machine body by using positioned values measured at any three positions under rotation of the upper rotating body with the GNSS receiver and angular values measured by the first angle detecting device provided on the upper rotating body.

(6) Further, in case that the construction working machine is the backhoe or a construction working machine in which the configuration of a movable tool is similar to that of the backhoe, the method of positioning and determining said calibration position and said position coordinate of the tip of the movable working tool during operation by the first surveying device, is characterized in that the rotation center position of the upper rotation body is positioned as a position coordinate of the machine body in the world geodetic system, the rotation center position of the boom as the movable working tool is positioned as the position coordinate in the world geodetic system from the position of the machine body in the world geodetic system, and the position coordinate of the tip of the movable working tool is determined as the position coordinate in the world geodetic system from the position coordinate of the rotation center position of the boom in the world geodetic system.

(7) Then, in case that the construction working machine is the backhoe and a construction working machine in which the configuration of a movable tool is similar to that of the backhoe, the method of the of the calibrating the constituent position of the movable tool in the machine body, is characterized in that said bucket, said arm, and said boom are made stationary in prescribed positions, respectively, the prescribed positions of said bucket of said movable working tool is measured as said measurement positions by using said optical surveying device, a coordinate of the constituent position of said movable working tool in said machine body is obtained by matching said measured position coordinates of said bucket at said prescribed location of said movable working tool, the constituent position of the movable working tool in the machine body is determined by is determined based on the determined coordinate of the constituent position during operation.

(8) In case that the construction working machine is the bulldozer or a construction working machine in which the configuration of a movable working tool is similar to that of the bulldozer, the method of measuring the position of the constituent dimension of the movable working tool with the optical type surveying device as the second surveying device, is characterized in that the measurement target place of said movable working tool is a prescribed place of said blade, and the position of the prescribed place of the blade is measured as said measurement position of said optical type surveying device, measurements at a plurality of said posture positions of the movable working tool are positional measurements at plural positions comprising two or more positions when said blade is rotated vertically in pitch directions and at two or more locations when said blade is rotated vertically in roll directions, and the length dimension of a frame of said blade and the position of an edge of the blade are obtained the measured values obtained by using measured values obtained by the positional measurements at a plurality of said positions and angle values at a plurality of said locations, respectively, by the angle detecting devices provided on said blade.

(9) Similarly, in case that the construction working machine is the bulldozer or a construction working machine in which the configuration of a movable working tool is similar to that of the bulldozer, the method for measuring the position of the machine body as a position coordinate in the world geodetic system with the first surveying device, is characterized in that the position and the moving direction of the machine body is determined and positioned as position coordinate in the world geodetic system by using the positioned value measured with the GNSS receiver provided in the machine body, and change amounts in the angular values and the movement values measured with the first angle detecting device provided in the machine body.

(10) Then, in case that the construction working machine is a bulldozer or a construction working machine in which the configuration of a movable working tool is similar to that of the bulldozer, the method for measuring the position of the machine body in the world geodetic system with the first surveying device, is characterized in that the position and the moving direction of the machine body is determined and positioned as position coordinate in the world geodetic system by using the positioned value measured with the GNSS receiver provided in the machine body, and change amounts in the angular values and the movement values measured with the first angle detecting device provided in the machine body.

(11) In case that the construction working machine is a bulldozer or a construction working machine in which the configuration of a movable working tool is similar to that of the bulldozer, the method in which the constituent position and the position coordinate of the tip of the movable working tool during operation are positioned and determined by the first surveying device, is characterized in that the blade is made stationary at a determined position, and the position of the prism at the edge of the movable working tool is determined with said optical type surveying device, the constituent position of the movable working tool in the machine body is determined by matching measured values of the determined position coordinate of the prism at the tip of the blade edge of the drive working tool, the position coordinate of the rotation center of the frame in the world geodetic system, the position coordinate of the machine body in the world geodetic system, and the position coordinate of the GNSS receiver provided on the machine body in the world geodetic system, and during operation the constituent position of the movable working tool is determined in reference to the determined calibrated position during operation.

(11) In case that the construction working machine is the bulldozer or a construction working machine in which the configuration of a movable working tool is similar to that of the bulldozer, the method in which the constituent position and the position coordinate of the tip of the movable working tool during operation are positioned and determined by the first surveying device, is characterized in that the blade is made stationary at a determined position, and the position of the prism at the tip of the blade edge of the movable working tool is determined with the optical type surveying device, the constituent position of the movable working tool in the machine body is determined by matching measured values of the determined position coordinate of a prism at the tip of the blade edge of the drive working tool, the position coordinate of the rotation center of the frame in the world geodetic system, the position coordinate of the machine body in the world geodetic system, and the position coordinate of the GNSS receiver provided on the machine body in the world geodetic system, and during operation the constituent position of the movable working tool is determined in reference to the determined calibrated position during operation.

(12) In addition to the specific inventive embodiments of the backhoe and the bulldozer as described above, the positioning calibration method according to the present invention may be that the construction working machine is not only the backhoe and the bulldozer but also the crane, the loader, the scrapper, the wheel loader or the work ladder car. Further, in the backhoe, not only the bucket, but also as an attachment to be attached to the tip of the arm, it can take such a form as a pile driving machine, a drill, a hammer, a grasper (gripper), a crusher (splitter), a cutter or an arm extension (extender of the arm). These are collectively referred to as attachments, and similarly attachments also exist for the arm and boom. These can be said to be objects for doctrine of equivalents of the present invention.

Thus, as to the positioning calibration method and its positioning calibration controller for the construction working machine according to the present invention, construction working machines incorporating the positioning calibration method and its positioning calibration controller for the construction working machines as correctly described above are also included in the present invention.

Then, the present invention is not limited to the above-described embodiments, and can be variously modified and implemented without departing from the scope of the present invention. It is claimed that these are a part of the technical idea, including all objects for the doctrine of equivalents of the present invention.

Effects of the Invention

According to the present invention, as a specific effect, the prism has only to be attached to one position in a case of the backhoe, and to one or two positions in a case of the bulldozer, so that the attached position(s) is(are) reduced. And, since it is stuck to the position which is ultimately desired, such as a blade top and a blade edge, the accuracy of calibration is high. And, since the system makes calculations automatically after measuring the prism with the TS, the labor for inputting is saved. In addition, even when calibration is required at the construction site, only the above-mentioned measures may be taken, and calibration work can be performed without expertise for such as data setting based on the structure of the machine. In particular, the coordinate of the machine body of the backhoe can be automatically calibrated, for example. On top of that, daily calibration can be performed accurately at the start of working with a simple and less laborious process, such as by placing the working tool to an upper rotation limit.

Even from an accuracy aspect, there is no sticking errors or their accumulation due to attachment of multiple prisms. It is not affected by irregularities, etc. coming from the structure of the machine body of the construction machine, and the accuracy is remarkably improved, because measurement and calibration can be carried out along axes of the coordinate systems can be carried out. Calibration processing is performed by the positioning system itself, regardless of external means, so calibration results can be used as is in positioning. As a result, the accuracy of calibration and positioning becomes highby the positioning system which the machine itself possesses. By eliminating low-precision methods such as placing the machine body as horizontally as possible, so that high-precision calibration can be made by the positioning system which the machine itself possesses. In addition, an economical merit of requiring only one set of an expensive GNSS receiver and an antenna is great.

Accordingly, it is an object of the present invention that the calibration is simplified, its precision can be enhanced, and the cost of the entire measuring instruments can be reduced by making the measuring instrument for the calibration the same as the measuring instrument for the positioning. Also, since the positioning system including the calibration can be set later on existing machines, it is possible to provide the method for simple positioning and calibration for the construction working machine, which corrected amounts can be more easily and reliably obtained by the tilt sensor disposed on the rotatable drive working portion of the construction working machine and the GNSS antenna disposed on the machine body.

Specifically, according to the present invention, the calibration can be simplified and its precision can be improved by making the measuring instrument for the calibration the same as the measuring instrument for the positioning. Also, the invention can provide the positioning calibration method by which the cost of the entire instruments can be reduced, and the positioning system including the calibration can be set later on existing machines.

BRIEF DESCRIPTION OF THE DRAWINGS

FIG. 1 is a perspective conceptual figure showing an image of the entire backhoe in the positioning calibration method for general construction working machines.

FIG. 2 is a perspective conceptual figure showing an image of the entire bulldozer in the positioning calibration method for general construction working machines.

FIG. 3 is a perspective conceptual figure showing an image of the coordinate systems in the entire backhoe of a construction working machine incorporating the positioning calibration method and its positioning calibration controller for the construction working machine according to an embodiment of the present invention.

FIG. 4 is a perspective conceptual figure showing an image of the coordinate systems of the entire bulldozer of a construction working machine incorporating the positioning calibration method and its positioning calibration controller for the construction working machine according to a further embodiment of the present invention.

FIG. 5 is a conceptual figure showing an image of the setting and calibration of coordinate system of a machine body of the construction working machine incorporating the positioning calibration method and the positioning calibration controller for the construction working machine according to a furthermore embodiment of the present invention.

FIG. 6 is a conceptual figure showing an image of the setting and calibration of the coordinate system of a machine body of the construction working machine incorporating the positioning calibration method and the positioning calibration controller for the construction working machine according to a further embodiment of the present invention.

FIG. 7 is a conceptual figure showing an image of a prism attachment position in a construction working machine incorporating the positioning calibration method and its positioning calibration controller for the construction working machine according to a further embodiment of the present invention.

FIG. 8 is a conceptual figure showing an image of the movement of a drive working tool of the backhoe of the construction working machine incorporating the positioning calibration method and its positioning calibration controller for the construction working machine according to a further embodiment of the present invention.

FIG. 9 is a conceptual figure showing an image of the movement of the drive working tool of the backhoe of the construction working machine incorporating the positioning calibration method and its positioning calibration controller for the construction working machine according to a further embodiment of the present invention.

FIG. 10 is a conceptual figure showing an image of the setting of the coordinate system of the bulldozer of the machine body of the construction working machine incorporating the positioning calibration method and its positioning calibration controller for the construction working machine according to a further embodiment of the present invention.

FIG. 11 is a conceptual figure showing an image of prism attachment positions of the bulldozer of the construction working machine incorporating the positioning calibration method and its positioning calibration controller for the construction working machine according to a further embodiment of the present invention.

FIG. 12 is a conceptual figure showing an image of the movement of the blade of the bulldozer of the construction working machine incorporating the positioning calibration method and its positioning calibration controller for the construction working machine according to a further embodiment of the present invention.

FIG. 13 is a conceptual figure showing an image of the movement of the blade of the bulldozer of the construction working machine incorporating the positioning calibration method and its positioning calibration controller for the construction working machine according to a further embodiment of the present invention.

FIG. 14 is a conceptual figure showing an image of the movement of the blade of the bulldozer of the construction working machine incorporating the positioning calibration method and its positioning calibration controller for the construction working machine according to a further embodiment of the present invention.

FIG. 15 is a conceptual figure showing an image of the movement of the blade of the bulldozer of the construction working machine incorporating the positioning calibration method and its positioning calibration controller for the construction working machine according to a further embodiment of the present invention.

FIG. 16 is a conceptual figure showing an image of the movement of the blade of the bulldozer of the construction working machine incorporating the positioning calibration method and its positioning calibration controller for the construction working machine according to a further embodiment of the present invention.

FIG. 17 is a conceptual figure showing an image of the movement of the blade of the bulldozer of the construction working machine incorporating the positioning calibration method and its positioning calibration controller for the construction working machine according to a further embodiment of the present invention.

EXPLANATION OF REFERENCE NUMERALS

Reference Numerals in the Drawings

1—backhoe, 2—bulldozer, 3—World geodetic system (Absolute Coordinate System), 4—machine body coordinate system, 5—working tool coordinate system (drive working machine coordinate system), 6—total stations (TS), 10—control compartment, 11—upper rotating body (main part of machine body), 12—boom, 13—arm, 14—bucket, 15—lower moving body (caterpillar), 16—GNSS (Global Navigation Satellite System/whole sphere positioning satellite system) receiver (antenna), 17—tilt angle sensor (tilt sensor), 18—controller, 19—control box, 20—GNSS fixed station, 21—main body of upper machine body, 22—grade, 23—frame, 24—blade edge, 25—bucket tip, 30—IMUs consisting of a 3-axis accelerometer and a 3-axis gyro sensor (Inertial Measurement Unit), 31—axis of rotation, 32—prism, 33—upper part of the machine body,

EMBODIMENTS FOR CARRYING OUT THE INVENTION

Hereinafter, explanation will be given to the embodiments for carrying out the present invention with reference to the drawings. Incidentally, the following description schematically shows a range necessary for explanation to achieve the object of the present invention, and mainly explains the range necessary for the description of the corresponding portions of the present invention, while portions for which explanation is omitted rely on the known art.

FIG. 1 is a perspective conceptual figure showing an image of the entire backhoe as a construction working machine (herein referred to also construction machine) incorporating a calibration method and a positioning method for a general construction machine. As shown in the figure, the backhoe 1 as a construction machine comprises an upper rotation body (a main body of a machine body) 11 including a control compartment 10, a boom 12, an arm 13 and a bucket 14 as a drive working tool (herein referred to also as movable working tool), and a lower moving body 15 as a caterpillar.

GNSS receivers (antennas) 16 are attached to the back of an upper rotator 11, and tilt sensors as inclination angle sensors 17 are attached to the boom 12, the arm 13, the bucket 14, and the back of the upper rotator 11, respectively. A controller 18 and a control box 19, which are liquid crystal display screens, are installed in a control compartment 10. Also, there is a GNSS fixed station 20 outside.

FIG. 2 is a perspective conceptual figure showing the entire bulldozer as a construction machine incorporating a calibration method and a positioning method for a general construction machine. As shown in the figure, it comprises an upper machine body 21 including a control compartment 10 of a bulldozer 2 as a construction machine, a blade (soil removal plate) 22 as a drive working tool, frames 23 for moving the blade 22, and a lower moving body 15 as a caterpillar.

GNSS receivers (antennas) 16 are attached at both ends of the blade 22, and a tilt sensor as a tilt angle sensor 17 is attached to a substantially central portion of the blade 22. A controller 18 and a control box 19 (not shown), which are liquid crystal screens, are installed in the control compartment 10. Also, there is a GNSS fixed station 20 (not shown) outside.

First, the coordinate systems will be described.

The coordinate system of the GNSS is the coordinate system of the world geodesic system (absolute coordinate system), and each point on the earth is shown in the coordinate system. The zenith is taken as the Z-axis, north as the X-axis, and east as the Y-axis. It is finally required to obtain the position of a tip of the bucket of the backhoe and that of a blade edge 24 of the bulldozer 2 as the construction machines in this world geodesic system. A design plane in a construction site for the construction machine is in the coordinate system of the world geodesic system (Generally, the coordinate system is a right screw system, while the world geodesic system is a left screw system).

The coordinate system of the machine body of the construction machine is the coordinate system of a main portion of the machine body, the backhoe 1 takes the rotation axis of the upper rotation body (including the control compartment) 11 as the coordinate system of the main body 11 of the machine body, and the bulldozer 2 also takes the upper part including the control compartment as the coordinate system of the main body 21 of the machine body. These coordinate systems take the zenith as the Z-axis, the forward direction as the X-axis, and the left direction as the Y-axis as viewed in the left direction from the control compartment 10. However, in positioning in the world geodetic system (absolute coordinate system), only the axes names are converted.

The coordinate system for the drive working tool is related to that for the machine body. That is, the coordinate system for the boom 12, the arm 13, and the bucket 14 of the backhoe 1 and the coordinate system for the blade 22 of the bulldozer 2 are associated with that of the machine body, and at the same time they are positioned by converting them to the world geodetic system (absolute coordinate system).

Next, a specific embodiment of the backhoe will be explained.

FIG. 3 is a perspective conceptual figure showing an image of the coordinate system of the entire backhoe of the construction machine incorporating the positioning calibration method and the positioning calibration controller for the construction working machine according to an embodiment of the present invention. As shown in the figure, the GNSS receiver 16 and the antenna are installed as one set on the upper rotation body 11. The antenna is installed at a location away from the rotation axis of the upper rotation body 11. The GNSS receiver 16 and the antenna may be integral. On the upper rotating body 11, an IMU (Inertial Measurement Unit, inertial measuring device) 30 consisting of a 3-axis acceleration sensor and a 3-axis gyro sensor is installed. (An IMU consisting of the three-axis acceleration sensor and the three-axis gyroscope sensor (Inertial Measurement Unit, inertial measurement device is hereinafter abbreviated as "IMU".)

The IMU is a device which measures acceleration and angular velocity with an acceleration sensor and a gyroscope sensor (=gyroscope=angular velocity sensor), thereby recognizing the position and posture. The angle sensor is specialized for the detection of the rotation angle of the IMU, and obtains the rotation angle by integrating the angular velocity.

At that time, the gravitational acceleration is detected with the acceleration sensor, so that a drift (deviation) in the angle detection can be offset. In the present application, the IMU is defined and described as a concept including an angle sensor. Of course, the same applies to a tilt sensor or the like. That is, the present application includes an angle sensor in the IMU.

A similar IMU is set for each of the boom 12, the arm 13, and the bucket 14. (When the amount of rotation plane of each of the boom 12, the arm 13 and the bucket 14, which is inclined from the vertical, is small, and the accuracy of the position of the tip 25 is not severe, only an IMU consisting of a one-axis acceleration sensor and a one-axis gyroscope may be mounted. In that case, the calculation described below handles one-axis rotation only.)

First, the coordinate system for the machine body is set as an initial calibration as follows. For example, this setting may be performed at the time of the installation of the measuring device or at the time of the factory shipment. FIG. 5 is a conceptual figure showing an image of the setting and the calibration of a machine body coordinate system incorporating the calibration method and the positioning method for the construction machine and its controller according to an embodiment of the present invention. It will be described with reference to FIGS. 3 and 5.

As shown in FIG. 3, the lower moving body 15 is made and kept stationary for a time period in which the GNSS receiver 16 is stabilized, while rotating the upper rotator 11, and positions P1, P2, P3 of the GNSS antenna 16 are measured in the world geodetic system at three locations (see FIG. 5). When turning, the rotation angles among respective P1, P2, P3 are measured with IMU30 (measured by integrating the angular velocity of the gyroscope sensor of the IMU).

On the P1P2P3 plane, the center of rotation can be obtained from an isosceles triangles determined by each two points and the angles therebetween. The average position among the three rotation centers obtained is taken as the rotation center, which is taken as the origin O of the machine body coordinate system 4. If the dispersion of the three rotation centers is large, it may be determined by measurement points at which errors are stabilized by increasing the number of points to be measured.

The method of measuring the position P1, P2, P3 of the GNSS antenna 16 in the world geodetic system is not particularly limited, it may be that for example, a prism is attached to GNSS antenna, and positions P1, P2, P3 of the GNSS antenna 16 are measured in the world geodetic system at three locations by the total station (TS) 20. The method of determining the origin O of the coordinate system 4 of the machine body (herein, also referred to as "main body coordinate system") is not particularly limited. For example, on P1P2P3 plane, a point equidistant from the positions P1, P2, P3 of GNSS antenna 16 may be used as the origin O of the machine body coordinate system 4.

The P1P2P3 plane is taken as an xy plane of the machine body coordinate system. Of these, the axis, which is parallel to the horizontal rotation plane of working tool coordinate system 5 to be described later, is taken as an x axis. (This may be a method of transforming the coordinate system by setting an x-axis and a y-axis in any orthogonal direction.) The zenith direction be z.

This determines the position of the GNSS antennae 16 in the machine body coordinate system 4

In the same condition, the present state of the IMU30 is held as the original posture of the IMU30. That is, the direction of the gravitational acceleration of the IMU acceleration sensor is held.

Next, the measurement is performed when the machine body is in operation.

FIG. 6 is a conceptual figure showing an image of the setting and the calibration in the machine body coordinate system of the construction machine incorporating the positioning calibration method and its positioning calibration controller for the construction working machine according to an embodiment of the present invention It will be described with reference to FIGS. 3 and 6.

The GNSS antenna deviates from the position of GNSS16, the position of the antenna is grasped by the GNSS fixed station 20 and the GNSS16.

The relative position between the machine body coordinate system 4 and the world geodetic system 3 is recognized by the position of the GNSS antenna 16 in the machine body coordinate system 4 and the posture recognition recognized with the IMU30. The relative movement of the posture from the original posture can be recognized from the rotation at each axis in three dimensions.

The position of the origin in the machine body coordinate system 4 in the world geodetic system and the rotation angle of each axis for the machine body coordinate system 4 and the world geodetic system 3 are grasped. The deviation of the posture due to IMU30 can be obtained by integrating the angular velocity values of the gyro sensor in each axis from the value of the original posture.

The above is prepared as a coordinate transformation calculation between the machine body coordinate system 4 and the world geodetic system 3.

When the origin O is stationary, there is no movement of the lower moving body 15 of the machine body and the antenna position can be stably taken at two or more locations, the recalibration at the time of operation can be reset by resetting the original posture of IMU30, and thereafter the relative moment can be recognize the relative movement from that posture.

EXAMPLES

Setting and calibration of the working tool coordinate system will be explained.

FIG. 7 is a conceptual figure showing an image of the attachment position of a prism in a construction machine incorporating the calibration method and the positioning method and its controller for the construction machine according to an embodiment of the present invention FIG. 8 is a conceptual figure showing an image of the movement of a drive working tool of the backhoe of the construction machine incorporating the positioning calibration method for the construction working machine and its controller according to an embodiment of the present invention. The setting and the calibration of the coordinate system 5 for the drive working tool (boom 12, arm 13, bucket 14) will be described with reference to FIGS. 7 and 8.

Example 1

First, measurement of the drive working tool is performed under rotation. This will be performed continuously to the setting and the calibration of the machine body coordinate system. As shown in FIG. 7, for example, the prism is held on a blade tip 25 of the bucket, and the world geodesic coordinate 3 of the blade tip is measured by the total station (TS) 6. The measurements is made from a side of the backhoe. Stability of accuracy can be expected, because only the side position is measured from TS at the same depth.

As shown in FIG. 8, while the boom 12 and the arm are fixed, the bucket 14 only is rotated, and two $P_i$ of the blade tip 25 of the bucket are measured in the global geodesic system.

Then, the arm 13 is rotated, the above is performed. The total number of measurement points is 4.

Next, the boom 12 is rotated, and the above is repeated. The total number of measurement points is 8.

$O^2$, $O^3$, $P_i$ are measured and determined in advance at the upper limits of rotation of the boom 12, the arm 13 and the bucket 14 (which may be used with $P_8$). This is the original postures of the working tool.

Rotation planes of the boom 12, the arm 13 and the bucket 14 are determined based on the above eight points or more.

On the rotation plane, $O^3{}_4$ as a vertex of an isosceles triangle and the bucket length $L_3$ are obtained from $P_8$, $P_7$ and $\delta_4$.

In the following, the rotation center $O^1$ of the boom, the boom length $L_1$, the arm length $L_2$, and the bucket length $L_3$ are determined as in the same manner. If each value is not stable due to error, the number of measurement points may be increased.

There is no particular limitation on how to determine the rotation centers and length $L_1$, length $L_2$, and length $L_3$ of the boom 12, the arm 13, and the bucket 14, respectively.

For example, the boom 12 and the arm 13 are fixed, the bucket 14 only is rotated, $P_i$ of the bucket blade tip 25 is measured in the world geodetic system, a point equidistant from these three points on the rotation plane of the boom 12, the arm 13, and the bucket 14 is taken as the rotation center of the bucket, and the distance between the rotation center of the bucket and $P_i$ may be taken as $L_3$ of the bucket. In the following, the boom rotation center $O^1$, the boom length $L_1$, and the arm length $L_2$ are obtained in the same way.

Next, in the machine body coordinate system 4, the rotation face of a rotation center $O^1$ of the boom 12, the boom 12, the arm 13, and the bucket 14 is determined. At the time of calibration, the machine body coordinate system 4 and these values are also determined in the world geodetic system 3, so they can be combined.

The coordinate system with the rotation center $O^1$ of the boom 12 as the origin, the axis parallel to the xy plane of the machine body coordinate system 4 and toward the bucket 14 as x, and the axis perpendicular to it and in the zenith direction as y is taken as the working tool coordinate system 5. (The coordinate system may be converted by setting the x-axis and the y-axis in any orthogonal directions.)

Values of $O^2$, $O^3$, and $P_i$ are determined in the working tool coordinate system 5 at the upper rotation limits shown in FIG. 8. They can be used for the calibration at the time of operation. The setting of this coordinate system may be performed at a low frequency.

It may be performed in the same way as the setting of the machine body coordinate system 4.

The setting and the calibration of the machine body coordinate system 4 and the working tool coordinate system 5 may be performed again when mechanical errors or distortion occurs in the machine body or the rotator and they are accumulated. These can be done at the working sites.

As described above, measurement and calibration of the construction machine can be easily performed in the field during the operation of the construction machine by performing the calibration method and the positioning method for the construction machine according to the one embodiment of the present invention. The measurement at the time of the operation of the machine body is as follows.

Rotation of each of the boom 12, the arm 13 and the bucket 14 is measured to determine the position of the blade tip 25 of the bucket in the working tool coordinate system 5.

The position of the bucket blade tip 25 in the machine body coordinate system 4 is obtained by converting the coordinate system from the working tool coordinate system 5 to the machine body coordinate system 4.

From the position of the GNSS antenna 16 and the rotation of the machine body recognized with the MU30, the position of the blade tip 25 of the bucket in the world geodetic system 3 can be determined by convert the coordinate system from the machine body coordinate system 4 to the world geodetic system 3.

The calibrations are below during the operation of the machine body. FIG. 9 is a conceptual figure showing an image of the movement of the drive working tool of the backhoe in the positioning calibration method and its positioning calibration controller for the construction working machine according to an embodiment of the present invention. It will be described with reference to FIG. 9.

As shown in FIG. 9, the boom 12, arm 13 and the bucket 14 are made stationary at the upper rotation limits, and their respective points are set to $O^2$, $O^3$, and $P_i$ at the start of the machine.

When errors in the IMU's angle recognition are accumulated, the above-mentioned resetting is performed. For example, the time period for error accumulation is grasped by prior evaluation, thereby being able to persuade the operator to reset.

(2) Example 2

Next, an embodiment of a bulldozer will be described.

FIG. 4 is a perspective conceptual figure showing an image of the coordinate system of the entire bulldozer in the positioning calibration method and its positioning calibration controller for the construction working machine according to the embodiment of the present invention. As shown in the figure, a set of GNSS receivers 16 and antennas is installed on the machine body. (As shown in the figure, An integrated type of the GNSS receiver 16 and the antenna may be acceptable.) The IMU (Inertial Measurement Unit, inertial measuring device) 30 consisting of the 3-axis accelerometer and the 3-axis gyroscope sensor is installed on the machine body. They are mounted on the upper machine body 21 on the machine body.

As shown in FIG. 4, the similar IMU is set on top of the blade (soil removal plate) 22. According to the operating structure of the blade, the frames (push arms) 23 are rotated in reference to a rotation axis near a central portion of the machine body, so that the entire blade 22 moves up and down. (This movement is called "pitch".) Also, the blade so rotates that the heights at the left and right sides of the blade 22 may change. (This movement is called "roll".) Although the right and left sides of the blade 22 also rotate forward or backward (this movement is called "yaw"), this rotation needs not be considered from the characteristics of the bulldozer 2 that discharges soil while advancing.

First, the setting and calibration of the machine body coordinate system 4 will be described.

FIG. 10 is a conceptual figure showing an image of setting of the machine body coordinate system of a bulldozer of a construction machine incorporating the positioning calibration method and its positioning calibration controller for the construction working machine according to the embodiment of the present invention. As shown in the figure, an auxiliary device as a turntable is set. In other words, in the case of the bulldozer, because the main body 21 of the upper machine body does not circle.

The rotary table, which is the auxiliary device, is mounted on the upper main body 21 of the machine body. (FIG. 10 shows only the movement with no turn table.) The antenna of GNSS receiver 16 is installed, so that receptions can be made at a plurality of locations only by turning the turntable. The turntable is adapted to be turned about 60 degrees or 120 degrees to the left and right.

Initial calibration and setting of the machine body coordinate system will be explained. This initial calibration may be performed, for example, at the time of installation of the measuring device, or at the time of the factory shipment.

The machine body is made stationary, the turn table is rotated, and kept stationary for a time period in which the GNSS reception 16 becomes table, then the antenna positions $P_1$, $P_2$, and $P_3$ are measured at three locations in the world geodetic system 3 and the rotation angles are measured by the IMU. Calculation is made in the same way as the backhoe. (Of course, it should be fixed at one place during the operation of the machine body.)

The plane of $P_1P_2P_3$ is taken as a plane xy in the machine body coordinate system 4. Of these, the axis to be parallel to the pitch rotation plane of the working tool coordinate system 5 described later is taken as x. (The x-axis and y-axis may be set in any orthogonal directions to convert the coordinate system.) The zenith direction is set to z. This determines the position of the antenna in the machine body coordinate system 4.

Under the same conditions, the present state of the IMU30 is held as the original posture of the IMU. That is, the direction of the gravitational acceleration of the IMU acceleration sensor is held.

Use of the machine body coordinate system will be explained.

Measurement at the operation of the machine body is the same as that of the backhoe. Regarding the re-calibration during the operation, O is stationary (when there is no movement of the lower part of the machine body), and the antenna positions are stably acquired at two or more locations by turning the turntable, the original posture of the IMU is reset, and after that, the relative movement from that posture is recognized.

Setting and calibration of the working tool coordinate system 5 of the bulldozer 2 will be described. FIG. 11 is a conceptual figure showing an image of a prism attachment position in the bulldozer of the construction machine incorporating the calibration method and the positioning method and their controller for the construction machine according to the embodiment of the present invention. FIG. 12 is a conceptual figure illustrating an image of the movement of the blade of the bulldozer of the construction machine incorporating the positioning calibration method and its positioning calibration controller according to the embodiment of the present invention. FIG. 13 is also a conceptual figure illustrating an image of the movement of the blade of the bulldozer in the positioning calibration method and its positioning calibration controller for the construction working machine according to an embodiment of the present invention.

First, referring to FIGS. 11, 12 and 13, measurements of the rotations of the pitch and the roll of the blade 22 as an operation working tool are performed. Prisms are held at both ends of the lower side of the blade 22, and the prism positions are measured in the world geodesic coordinate 3 with the total station (TS).

The pitch is fixed by the push arms 23, the blade 22 is rolled, and changed point $P_{1R}$ $P_{2R}$ and $P_{1L}$, $P_{2L}$ etc. at both ends of the blade are measured in the world geodetic system 3.

A rotation plane of $P_{1R}$, $P_{2R}$, $P_{1L}$, and $P_{2L}$ is determined.

On the rotation plane, $O^2_1$ as the vertex of the isosceles triangle and the length $L_2$ on the blade are determined from $P_{1R}$, $P_{2R}$ and the rotational angle $\delta_1$.

Similarly, the length $L_3$ is obtained from $P_{1L}$, $P_{2L}$ and the rotation angle $\delta_1$.

The push arms are rotated (pitch), and the above procedure is performed twice in the same manner.

A rotating plane of the pitch is determined from $O^2_1$, $O^2_2$, $O^2_3$.

$O^1$ as vertexes of two isosceles triangles and the push arm length $L_3$ are determined from $O^2_1$, $O^2_2$, and $O^2_3$.

$O^2$ at the upper pitch limit and $P_i$ at either of the roll limits (which may be used with $P_{4R}$ or $P_{3L}$) are determined in advance by measurement, and this is taken as the original posture of the working tool. If each value is not stabilized due to errors, the number of measurement points is increased. With respect to the center of the roll, if the blade is expected to be symmetrical, the prism may be one on one side. At that time, three Ps are taken for each roll, and $O^2$ is determined on that plane.

How to determine the rotation centers of the push arm 23 and the blade 22 is not particularly limited. For example, the pitch is fixed by the push arms 23, the blade 22 is rolled, and changed points of the ends of the blade are measured at three locations in the world geodetic system 3, a point equidistant from each of the three points on the rotation plane, such as the rotation center may be set at $O^2_1$ of the blade.

Similarly, on the pitch rotation plane of $O^2_1$, $O^2_2$, $O^2_3$, a point equidistant from $O^2_1$, $O^2_2$, $O^2_3$ may be the rotation center may be taken as the rotation center $O^1$ of the push arm 23.

The setting of the working tool coordinate system 5 will be explained.

In the machine body coordinate system, the rotation center $O^1$ and a pitch rotation plane of the push arm 23 are obtained. At the time of calibration, the machine body coordinate system and these values are also obtained in the world geodetic system 3, so they can be combined.

A coordinate system in which $O^1$ is taken as the origin, an axis parallel to the xy-plane of the machine body coordinate system and toward the center of the roll of the blade as x, and an axis perpendicular to it and in the zenith direction as z, and a y-axis determined by the right-hand thread system is taken as the working tool coordinate system.

(The x-axis and y-axis may be set in any orthogonal directions to convert the coordinate system.)

Values of $O^2$, and $P_i$ at the upper rotation limit are determined in advance in the working tool coordinate system 5. Because, it is used for calibration at the time of operation.

The setting of this coordinate system may be performed at a low frequency. (It may be done in the same way as the setting of the machine body coordinate system.)

The setting and calibration of the machine body coordinate system 4 and the working tool coordinate system 5 may be performed again when mechanical errors or distortion occurs in the machine body or the rotation members and they accumulate.

This can be done at a working site.

The measurement of the bulldozer when the machine body is in operation will be explained below.

Each of rotations of the pitch and the roll is measured, and the blade edges of the blade are determined at both ends thereof in the working tool coordinate system.

The positions of edges 24 at both ends of the blade in the machine body coordinate system 4 is obtained by converting the coordinate system from the working tool coordinate system 5 to the machine body coordinate system 4.

From the position of GNSS antenna 16 and the rotation of the machine body recognized by the IMU, the positions of the blade edges 24 at both ends of the blade are obtained in the world geodetic system by converting the machine body coordinate system 4 to the world geodetic system 3.

Next, the calibration of the bulldozer when the machine body is in operation will be explained. FIG. 14 is a conceptual figure showing an image of a movement of the blade of the bulldozer in the construction machine incorporating the calibration method and positioning method and its positioning calibration method for the construction machine according to the embodiment of the present invention.

As illustrated in FIG. 14, at machine start-up, the push arm 23 and the blade 22 are made stationary at upper rotation limits, and their respective points are set to a $O^2$ and $P_i$.

When the errors accumulate in the recognition of the angles with IMU, the above-mentioned resetting is performed. For example, the time period for which errors accumulate is grasped by prior evaluation, thereby persuading a pilot to reset.

In addition, further embodiments will be described below for setting and calibrating the working tool coordinate systems of the bulldozer. Since the upper part of the machine body of the bulldozer does not rotate, the machine body coordinate system and the working tool coordinate system can be integrally treated, so that the position of the GNSS antenna is also specified in that coordinate system at the time of the setting of the working tool coordinate system. In other words, the setting of the machine body coordinate system is incorporated into the setting of the working tool coordinate system.

Therefore, then the machine body is advanced, and the posture of the IMU can be judged at that time from changes of the antenna position and the deviation between the acceleration and the angle detected by the IMU. During the operation of the machine body, the coordinate of the blade edge of the blade can be recognized by grasping the absolute position in the working tool coordinate system (world geodetic coordinate system) from the position of the antenna and the posture of the IMU and further recognizing the posture of the blade with the IMU.

FIG. 15 is a conceptual figure showing an image of the movement of a blade of a bulldozer of a construction working machine incorporating the positioning calibration method and its positioning calibration controller for a construction working machine according to a further embodiment of the present invention. It is shown below with reference to FIGS. 15 and 12.

First, turnings of the pitch and the roll of the blade 22 as a working tool are measured.

The pitch of the push arm (frame) 23 is fixed, the blade 22 is rolled, and the change points: $P_{1R}$, $P_{2R}$ and $P_{1L}$, $P_{2L}$, at both ends of the blade are measured in the world geodetic system.

A rotation plane of $P_{1R}$, $P_{2R}$ $P_{1L}$, and $P_{2L}$ is obtained.

Next, $O^2_1$ as the vertex of an isosceles triangle and the length $L_2$ on the blade are obtained from $P_{1R}$ $P_{2R}$ and the rotation angle $\delta_1$ on the rotation plane.

Similarly, the length $L_3$ is determined from $P_{1L}$, $P_{2L}$ and the rotational angle $\delta_1$.

Similarly to the above, the push arm (frame) 23 is rotated (pitch rotation), and the above is performed once again.

On a plane perpendicular to the rolling plane of the blade, $O^1$ of the vertex of the two isosceles triangles and the push arm length $L_1$ are determined from $O^2_1$, $O^2_2$ and a rotation angle $\theta_1$. If each value is not stable due to error, it is sufficient to increase the number of measurement points. To measure the original posture of the working tool, $O^2$ at the upper limit of the pitch, and $P_i$ at either of the limits of the roll have only to be measured.

$P_{4R}$ or $P_{3L}$ may be used in common.

How to determine the rotation centers of the push arm (frame) 23 and the blade 22 is not particularly limited. For example, the pitch is fixed by the push arms 23, the blade 22 is rolled, change points of the blade end are measured at three points in the world geodetic system 3, and a point equidistant from each of three points on the rotating surface may be set to such as the rotation center $O^2_1$ of the blade. The push arm (frame) 23 is rotated (pitch rotation), and a point on a plane perpendicular to the roll rotation plane of the blade equidistant from the rotation centers of the blade, $O^2_1$, $O^2_2$, $O^2_3$ obtained further twice similarly to the above, may be a rotation center $O^1$ of the push arm (frame) 23.

Next, the setting of the working tool coordinate system will be explained.

$O^1$ is taken as the original point. In the pitch plane of the blade set perpendicular to the roll plane of the blade, the coordinate system consisting of the x-axis perpendicular to the direction of gravitational acceleration of IMU and extending toward the blade from $O^1$, the axis-z in the zenith direction and perpendicular to x-axis, and the y-axis determined by the right-hand screw system, is defined as the working tool coordinate system. Regardless of the gravitational acceleration, an arbitrary axis in the pitch plane of the blade may be taken as the x-axis. The position of the GNSS antenna (world geodetic system) to be measured in setting up the tool work system is determined as a position in the working tool coordinate system, as well as in the working tool coordinate system.

Setting of the original posture of the working tool will be explained.

As shown in FIGS. 14 and 15 (also see FIG. 17), $O^2$, $P_i$ in the upper rotation limit (world geodetic system) are calculated in the working tool coordinate system. This is taken as the original posture of the working tool. (This is used in calibration during the operation hereafter.) If errors accumulate due to repeated angle measurement during the operation, the original posture of the working tool is set again in the upper rotation limit field.

The working tool coordinate system may be set at a low frequency. For example, setting may be done at the time of shipment or when a GNSS and an IMU as the measuring devices is attached. Setting and calibration of the working tool coordinate system may be performed again when mechanistic errors or distortions occur in the machine body or the rotating members and they accumulate. That setting can be done in the work field is a big merit.

The posture setting (initial setting) of the IMU will be explained.

FIG. 16 is a conceptual figure showing an image of the movement of a bulldozer as a construction working machine including the positioning calibration method and its positioning calibration controller for the construction working machine according to an embodiment of the present invention. It will be explained with reference to the figure.

The machine body is made stationary to grasp the position of the GNSS antenna on the upper main body 21 of the upper machine body 21 and the angular information of the IMUs.

The machine body is moved by a predetermined distance (for example, 3 m forward along a straight line as much as possible to suppress errors) to grasp the position of the GNSS antenna and the acceleration information and the angular information of the IMUs leading to the movement.

The direction of the movement of the machine body at an arrival point is calculated from positional information on the locations of the starting point and the arrival point (global geodesic coordinates with the GNSS) and changes in acceleration and angular velocity related to the movement of the IMUs.

From the vector of this moving direction and the vector of gravitational acceleration detected by the IMU, the posture of the IMU can be determined.

In the positioning during the operation, the posture of this IMU is taken as the original posture of the machine body, and the posture at the positioning point of time is recognized by the angular change based on the original posture.

Recalibration during the operation will be explained.

Drifts (accumulation of errors through a stack of calculations) occur in recognition of the posture due to the angle changes from the reference posture. Since the machine body often stops in operation, it is sufficient to repeat the above-described setting and reset the reference posture of the IMU at the point of time when linear movement and stable stopping are continued.

Measurements during the operation of the machine body will be explained.

FIG. 17 is a conceptual figure illustrating an image of the motion of a blade of a bulldozer of a construction working machine incorporating the positioning calibration method and its positioning calibration controller thereof for a construction working machine according to another embodiment of the present invention. It will be explained with reference to FIG. 17.

Each rotation in the pitch and the roll is measured by the IMU on the blade, and the blade edges at both ends of the blade in the working tool coordinate system are determined by the change from the working tool original posture.

The blade edges at both the ends of the blade in the machine body coordinate system are obtained by converting from the working tool coordinate system to the machine body coordinate system.

From the position of the GNSS antenna, the angular change of the IMU from the original posture of the machine body, and the blade edges at both the ends of the blade in the working tool coordinate system, the blade edges at both the ends of the blade in the world geodetic system are obtained by converting the machine body coordinate system to the world geodetic system.

Calibration during the operation of the machine body will be explained. See FIG. 17.

At the start of the machine, the push arm and the blade are held stationary at their upward rotation limits and their respective points are set to O2 and Pi.

When the errors in the angle recognition of the IMU on the blade accumulate, the above-mentioned resetting is performed. For example, a prior evaluation may determine the time period for the error accumulation, so that it can persuade the operator to reset.

Thus, according to the positioning calibration method and its positioning calibration controller for the construction working machine according to the embodiments of the present invention, the following effects can be obtained.

It is sufficient to attach the prism at one place with the backhoe and at two or one place with the bulldozer.

The attachment points are reduced, and the calibration accuracy is high, because they are stuck at the positions to be determined finally, such as the tip of the blade and the blade edge.

After the prism is measured by TS, the system automatically makes calculations, which saves inputting labor.

Even when calibration is required at the construction site, only the above-mentioned measures may be taken, so that calibration work can be performed without expertise, such as data setting based on the structure of the machine.

Such calibration of the machine body coordinates of the backhoe and the like can be done automatically.

Daily start-up calibration can be performed accurately with a simple and fuss-free process, such as placing the tool in the upper rotation limits.

Accuracy eliminates sticking errors and its accumulation due to sticking plural prisms.

Accuracy is improved because it is not affected by irregularities on the structure of the machine body, and measurement and calibration can be performed along the axis of the coordinate system.

Regardless of the external means, the calibration process can be performed only by measuring a plurality of locations with TS and setting the lengths thereof separately. Further, since the calibration is performed by the positioning system itself, the calibration result can be used as it is in the positioning, and the calibration and the positioning become high accuracy.

By eliminating the low-precision methods in which the machine body is placed as horizontally as possible, high-precision calibration can be performed by the positioning system which the machine body possesses.

Since only one set of the GNSS and the antennas is required, the calibration can be performed by an inexpensive system.

The present invention is not limited to the embodiments described above, the present invention can be performed with various changes within the scope not departing from the scope of the present invention. All of them are part of this technical idea.

INDUSTRIAL APPLICABILITY

According to the present invention, the measurement instrument for calibration is made the same as the measuring instrument for positioning, so that the calibration can be simplified and accuracy of the calibration can be improved. Thus, the invention is aimed at the object that the cost of the entire measuring instruments can be reduced. Also, since the system of positioning including calibration can be set later on existing machines, the invention can provide the simple positioning calibration method in the construction working machine in which the corrected amount can be easily and reliably obtained by the inclination sensor disposed on the rotatable drive working portion in the construction working machine and the GNSS antenna disposed on the machine body.

Specifically, according to the present invention, the measuring instrument for the calibration is made the same as the measuring instrument for the positioning, so that the calibration can be easily performed, and the accuracy in the calibration can be performed. Also, the cost of the entire instruments can be reduced, and the positioning system, including calibration can provide the positioning calibration method that can be set later on existing machines.

According to the present invention, in the positioning and calibration of the construction machine, while significantly improving the safety and workability in the work process, and the positioning and calibration, which can significantly improve economic efficiency, are realized. The present invention can be used and applied regardless of the work sites. Therefore, this application brings great benefits to various industries involving the construction industry and the civil engineering industry.

What is claimed is:

1. A positioning calibration method for a construction working machine comprising:
 measuring and determining a constituent length and a constituent position of a movable working tool of the construction working machine, the construction working machine including:
  a first surveying device provided on a machine body for surveying a position coordinate of the machine body,
  a first angle detecting device provided on the machine body for detecting an angle of the machine body,
  at least one second angle detecting device provided on the movable working tool and for the movable working tool, and
  a second surveying device provided outside the construction working machine for surveying the position coordinates of a plurality of posture positions of the movable working tool, wherein:
  the position coordinates of the plurality of posture positions of the movable working tool are measured by the second surveying device, and
  the constituent length and the constituent position of the movable working tool are determined based on at least one rotational center of the movable working tool calculated using data of the measured position coordinates of the movable working tool and data of the angles of the movable working tool detected by the second angle detecting device.

2. The positioning calibration method for the construction working machine set forth in claim 1, wherein
 based on the constituent length and the constituent position and during operation of the construction working machine, the constituent position and the position coordinate of the movable working tool and a tip of the movable working tool during operation time are positioned and determined from operation time position measurement data and operation time posture data of the machine body measured by the first angle detecting device and the first surveying device of the machine body, respectively and operation time angle data of the movable working tool measured by the second angle detecting device.

3. The positioning calibration method for the construction working machine set forth in any of claim 2, wherein:
 in case that the construction working machine is a backhoe or a construction working machine in which the configuration of a movable working tool is similar to that of the backhoe, the movable working tool includes a bucket, an arm and a boom or an attachment of the arm or the boom, or in case that the construction working machine is a bulldozer, the movable working tool is a blade, or in case that the construction working machine is a crane, the movable working tool is a tip hook,
 the second surveying device is an optical surveying device including a total station (TS), a measurement target position of the movable working tool is taken as a measurement position of the optical surveying device, the position measurement is performed in a world geodetic system coordinate, and the first surveying device is a Global Positioning Satellite System (GNSS), the position measurement is performed in the world geodetic system, the position measured with the GNSS can be corrected by a reference base station outside the construction working machine or correction information contained in satellite signals, and
 the first and second angle detecting devices are angle sensors including an IMU (Inertial Measurement Unit).

4. The positioning calibration method for the construction working machine set forth in claim 3, wherein:
 in case that the construction working machine is a backhoe or a construction working machine in which the configuration of a movable working tool is similar to that of the backhoe, and the constituent length of the movable working tool is positioned and measured by the optical measuring device as the second measuring device, a prism is attached to a tip of the bucket,
 measurement of a plurality of the posture positions of the movable working tool are measurements of positions of the prism at posture positions, with the optical surveying device, at a plurality of positions including two locations when the bucket is rotated vertically, two locations when the arm is rotated vertically, and two locations when the boom is rotated vertically, and
 the constituent lengths of the bucket, the arm, and the boom are determined, respectively, by using measured values obtained by measurement of the positions at a plurality of the locations and angle values of the rotations measured at a plurality of the locations by the second angle detecting devices respectively provided on the bucket, the arm and the boom.

5. The positioning calibration method for the construction working machine set forth in claim 3, wherein:
 in case that the construction working machine is a backhoe or a construction working machine in which the configuration of the movable working is similar to that of the backhoe, and the position coordinate of the machine body is measured as a position coordinate in the world geodetic system by the first surveying device, and
 the GNSS receiver is provided at an upper rotating body of the machine body, and a rotation center position of the upper rotating body is determined and positioned as a place in the world geodetic system of the machine body by using positioned values measured at any three locations under rotation of the upper rotating body with the GNSS receiver and angular values measured by the first angle detecting device provided on the upper rotating body.

6. The positioning calibration method for the construction working machine set forth in claim 5, wherein:
 in case that the construction working machine is the backhoe or a construction working machine in which the configuration of a movable working tool is similar to that of the backhoe, the method of positioning and determining the constituent position and the position coordinate of the tip of the bucket of the movable working tool during operation by the first surveying device,
  the rotation center position of the upper rotation body is positioned as a position coordinate of the machine body in the world geodetic system,
  the rotation center position of the boom as the movable working tool is positioned as the position coordinate in the world geodetic system from the position of the machine body in the world geodetic system, and
  the position coordinate of the tip of the movable working tool is determined as the position coordinate in the world geodetic system from the position coordinate of the rotation center position of the boom in the world geodetic system.

7. The positioning calibration method for the construction working machine set forth in claim 6, wherein:
in case that the construction working machine is the backhoe and a construction working machine in which the configuration of a movable working tool is similar to that of the backhoe, the method of the calibrating the constituent position of the movable working tool in the machine body is that:
the bucket, the arm, and the boom are made stationary in prescribed positions, respectively,
the position coordinates of the constituent of the movable working tool in the machine body is determined by matching positioned values of the measured prism of the bucket of the movable working tool are measured by using the optical surveying device as said second surveying device,
a coordinate of the constituent position of the movable working tool in the machine body is obtained by matching measured values of the measured position coordinate of the prism of the bucket of the measured movable working tool,
a position coordinate in the world geometric system of the rotation center of the boom, and
a position coordinate in the world geometric system of the GNSS receiver provided on the upper rotation body, and
the constituent position of the movable working tool in the machine body is determined based on the determined constituent position coordinate during operation.

8. The positioning calibration method for the construction working machine set forth in claim 3, wherein:
in case that the construction working machine is the bulldozer or a construction working machine in which the configuration of a movable working tool is similar to that of the bulldozer, the method of position measuring and determining the constituent length of the movable working tool with the optical type surveying device as the second surveying device, wherein
a prism is attached to right/left tip of the blade,
measurements at a plurality of the posture positions of the movable working tool are positional measurements of the prism with the optical surveying device at plural positions including two or more locations when the blade is rotated vertically in pitch directions and at two or more locations when the blade is rotated in rolling directions, and
a constituent length of a frame of the blade is determined by using the measured values obtained through the positional measurements at a plurality of the positions and angle values of the rotations at a plurality of the locations, respectively, by the second angle detecting devices provided on the blade.

9. The positioning calibration method for the construction working machine set forth in claim 8, wherein:
in case that the construction working machine is the bulldozer or a construction working machine in which the configuration of a movable working tool is similar to that of the bulldozer, the method for measuring the position of the machine body as a position coordinate in the world geodetic system of the machine body with the first surveying device, and
the position and the moving direction of the machine body is determined and positioned as position coordinate in the world geodetic system by using the positioned value measured with the GNSS receiver provided in the machine body, and change amounts in the angular values and the movement values measured with the first angle detecting device provided in the machine body.

10. The positioning calibration method for the construction working machine set forth in claim 9, wherein:
in case that the construction working machine is the bulldozer or a construction working machine in which the configuration of a movable working tool is similar to that of the bulldozer, the method for positioning and determining the constituent position and the coordinate of the constituent position during operation of the tip of the movable working tool with the first surveying device, wherein
the position of the machine body is positioned as the position coordinate of the machine body in the world geodetic system,
the position coordinate of a rotational center of the frame of the moving working tool is determined and positioned as a position coordinate in the world geodetic system from the position coordinate of the machine body in the world geodetic system, and
the position coordinate of an edge of the blade is determined and positioned as a position coordinate in the world geodetic system from the position coordinate of the rotational center of the frame in the world geodetic system.

11. The positioning calibration method for the construction working machine set forth in claim 10, wherein:
in case that the construction working machine is the bulldozer or a construction working machine in which the configuration of a movable working tool is similar to that of the bulldozer, the method in which the constituent position of the movable working tool in the machine body is calibrated, wherein
the blade is made stationary at a determined position, and the position of the prism of the blade of the movable working tool is measured with the optical type surveying device as the second surveying device,
the constituent position of the movable working tool in the machine body is determined by matching measured values of the measured position coordinate of the prism of the blade of the movable working tool, the position coordinate of the rotational center of the frame in the world geodetic system, the position coordinate of the machine body in the world geodetic system, and the position coordinate of the GNSS receiver provided on the machine body in the world geodetic system, and
the constituent position of the movable working tool in the machine body is determined in reference to the determined constituent position during operation.

12. The positioning calibration method for the construction working machine set forth in claim 1, wherein the construction working machine is a backhoe, a bulldozer, a crane, a loader, a scrapper, a wheel loader, or a work ladder car.

13. A positioning calibration controller for a construction working machine for performing a positioning calibration method for a construction working machine according to claim 1.

14. A construction working machine comprising the positioning calibration controller according to claim 13.

* * * * *